US008677072B2

(12) United States Patent
Iyer et al.

(10) Patent No.: US 8,677,072 B2
(45) Date of Patent: Mar. 18, 2014

(54) SYSTEM AND METHOD FOR REDUCED LATENCY CACHING

(75) Inventors: Sundar Iyer, Palo Alto, CA (US); Shang-Tse Chuang, Los Altos, CA (US)

(73) Assignee: Memoir Systems, Inc., Santa Clara, CA (US)

( * ) Notice: Subject to any disclaimer, the term of this patent is extended or adjusted under 35 U.S.C. 154(b) by 515 days.

(21) Appl. No.: 12/928,698

(22) Filed: Dec. 15, 2010

(65) Prior Publication Data

US 2011/0145513 A1 Jun. 16, 2011

Related U.S. Application Data

(60) Provisional application No. 61/284,260, filed on Dec. 15, 2009.

(51) Int. Cl.
*G06F 12/00* (2006.01)
*G06F 13/00* (2006.01)

(52) U.S. Cl.
USPC ............ 711/141; 711/100; 711/118; 711/154

(58) Field of Classification Search
USPC .................. 711/100, 117, 118, 141, 154, 200
See application file for complete search history.

(56) References Cited

U.S. PATENT DOCUMENTS

| | | | |
|---|---|---|---|
| 4,725,945 A | 2/1988 | Kronstadt et al. | |
| 5,835,941 A | 11/1998 | Pawlowski | |
| 6,189,073 B1 | 2/2001 | Pawlowski | |
| 6,378,032 B1 | 4/2002 | Robertson | |
| 6,404,691 B1 | 6/2002 | Fujishima et al. | |
| 6,446,157 B1 | 9/2002 | McGehearty et al. | |
| 6,622,225 B1 | 9/2003 | Kessler et al. | |
| 6,801,980 B2 | 10/2004 | Ji et al. | |
| 6,948,028 B2 | 9/2005 | Ji et al. | |
| 7,047,385 B1 | 5/2006 | Bhattacharya et al. | |
| 7,171,323 B2 * | 1/2007 | Shipton et al. | 702/106 |
| 7,181,572 B2 * | 2/2007 | Walmsley | 711/128 |
| 7,203,794 B2 | 4/2007 | Ji et al. | |
| 7,770,008 B2 * | 8/2010 | Walmsley | 713/170 |
| 2002/0056022 A1 | 5/2002 | Leung | |
| 2004/0103250 A1 | 5/2004 | Alsup | |
| 2005/0091465 A1 | 4/2005 | Andreev et al. | |
| 2006/0190678 A1 | 8/2006 | Butler et al. | |
| 2007/0233959 A1 | 10/2007 | Hotta et al. | |
| 2008/0082755 A1 | 4/2008 | Kornegay et al. | |
| 2009/0182944 A1 | 7/2009 | Comparan et al. | |

FOREIGN PATENT DOCUMENTS

EP 1 006 435 A1 6/2000

OTHER PUBLICATIONS

Hans Mattausch, "Hierarchical N-Port Memory Architecture based on 1-Port Memory Cells", Sep. 16, 1997, Digital Object Identifier:10. 1109/ESSCIR.1997.186178.
Philip Koopman, "Main Memory Architecture", Oct. 19, 1998, Carnegie Mellon University.
Notification of PCT Search Report and written opinion for related PCT Application, mailed Feb. 22, 2011 (10 pages).

* cited by examiner

*Primary Examiner* — Tuan Thai
(74) *Attorney, Agent, or Firm* — Dag Johansen, Esq.

(57) ABSTRACT

A reduced latency memory system that prevents memory bank conflicts. The reduced latency memory system receives a read request and write request. The read request is then handled by simultaneously fetching data from a main memory and a cache memory. The address of the read request is compared with a cache tag value and if the cache tag value matches the address of the read request, the data from the cache memory is served. The write request is stored and handled in a subsequent memory cycle.

18 Claims, 18 Drawing Sheets

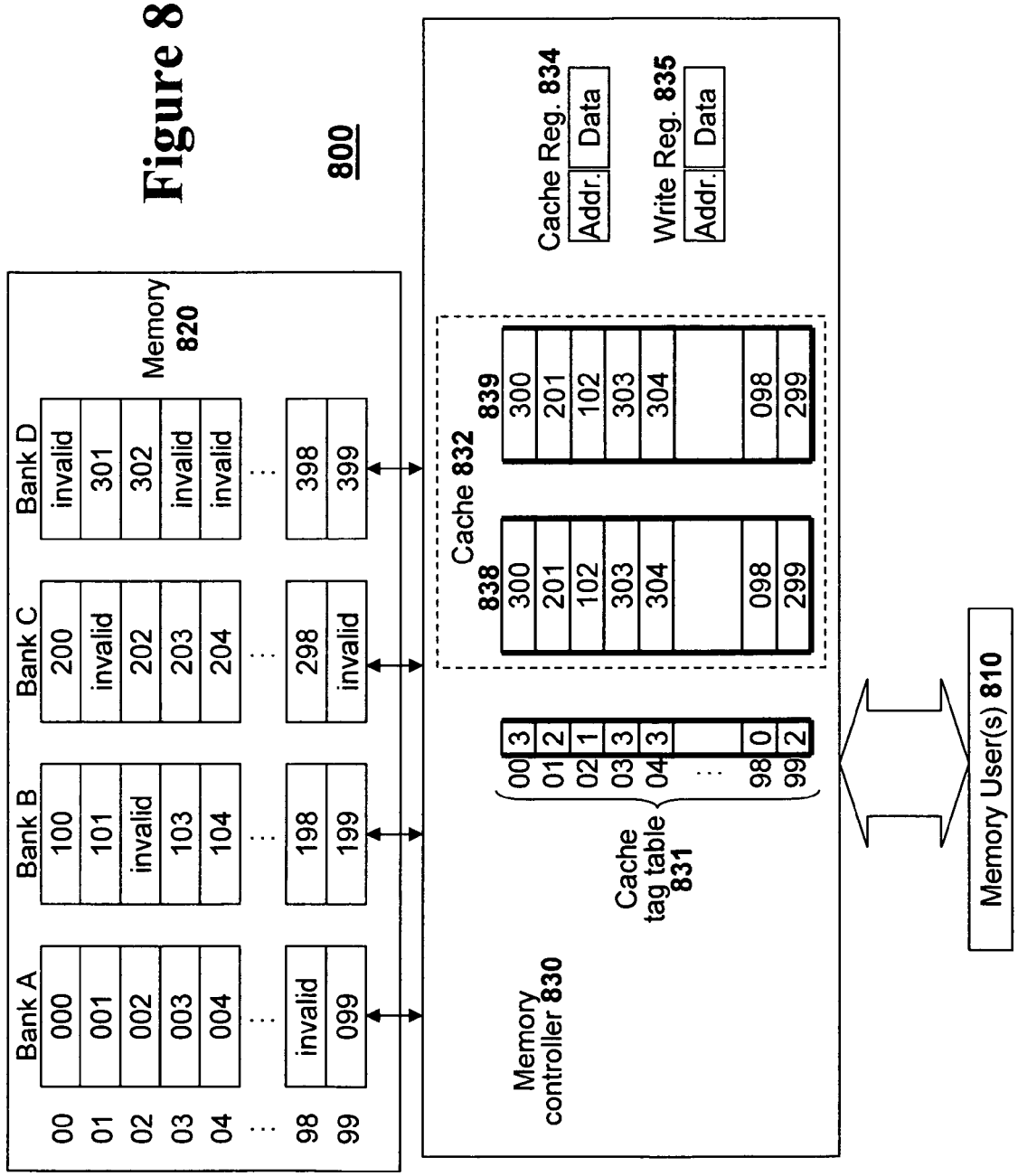

SYSTEM AND METHOD FOR REDUCED LATENCY CACHING

RELATED APPLICATIONS

The present application claims the benefit of the Provisional Patent Application entitled "SYSTEM AND METHOD FOR REDUCED LATENCY CACHING" having Ser. No. 61/284,260 that as filed on Dec. 15, 2009.

TECHNICAL FIELD

The present invention relates to the field of digital computer systems. In particular, but not by way of limitation, the present invention discloses techniques for rapidly responding to memory access requests made to digital memory systems.

BACKGROUND

Modern computer systems include at least one processor for processing computer instructions and a memory system that stores the computer instructions. The main memory of a typical computer memory system is generally implemented with some form of Dynamic Random Access Memory (DRAM). DRAM devices have a very high memory density (amount of data stored per area of integrated circuit used), low power usage, and a relatively inexpensive cost per data bit.

The speed at which computer processors operate has been continually increasing. Specifically, decreasing the size of the semiconductor transistors and decreasing the operating voltages of these transistors has allowed processor clocks to run at faster rates. In addition, the amount of data processed with each computer instruction has been increasing. The increased processing power has allowed high-speed three-dimensional processing to become inexpensive, very high-speed digital network routers to be constructed, and other computer application advances. These increasingly fast processors have greatly increased the demands that a processor puts on a memory system. Unfortunately, improvements to the performance of the computer memory devices that provide instructions and have not kept pace with the increasingly faster processors. Thus, the memory systems have become a bottleneck for computer performance.

Various different techniques have been used to increase the performance of memory systems in attempts to keep up with the demands of modern processors. Memory system parallelism is used to improve memory system speed by fetching large blocks of memory at a time such that individual instructions within the same fetched block may be quickly fed to a fast processor. Memory interleaving improves performance by using parallelism and hiding the effects of memory refresh operations.

The most well known technique for memory system performance is the use of cache memory systems. Cache memory systems improve memory system performance by duplicating sections of a main memory system in a smaller-speed memory system (the 'cache memory'). As long as a needed instruction or data item is represented within the cache memory system (a cache 'hit'), that instruction or data item can be quickly provided to the processor. However, when a needed instruction or data item is not represented within the cache memory system (a cache 'miss'), that instruction or data item must be fetched from the slower main memory system. Since cache misses will always occur, standard cache memory systems only provide a performance increase on a statistical average basis. However, each individual memory access may be slow due a cache miss.

Another feature often demanded from modern memory systems is ability to handle more than one memory operation at a time. For example, a system may wish to be able to issue both a read request and write request to a memory system at the same time. Due to the increasing demands put upon memory systems, advances in memory system design have been needed.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 8 illustrates a block diagram of a cache-based memory system for handling simultaneous memory read and memory write operations that can reduce latency when handling memory requests.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to computer processing systems used for packet-switched networks, the teachings can be used in many other environments. Thus, any digital system that uses digital memory can benefit from the teachings of the present disclosure. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
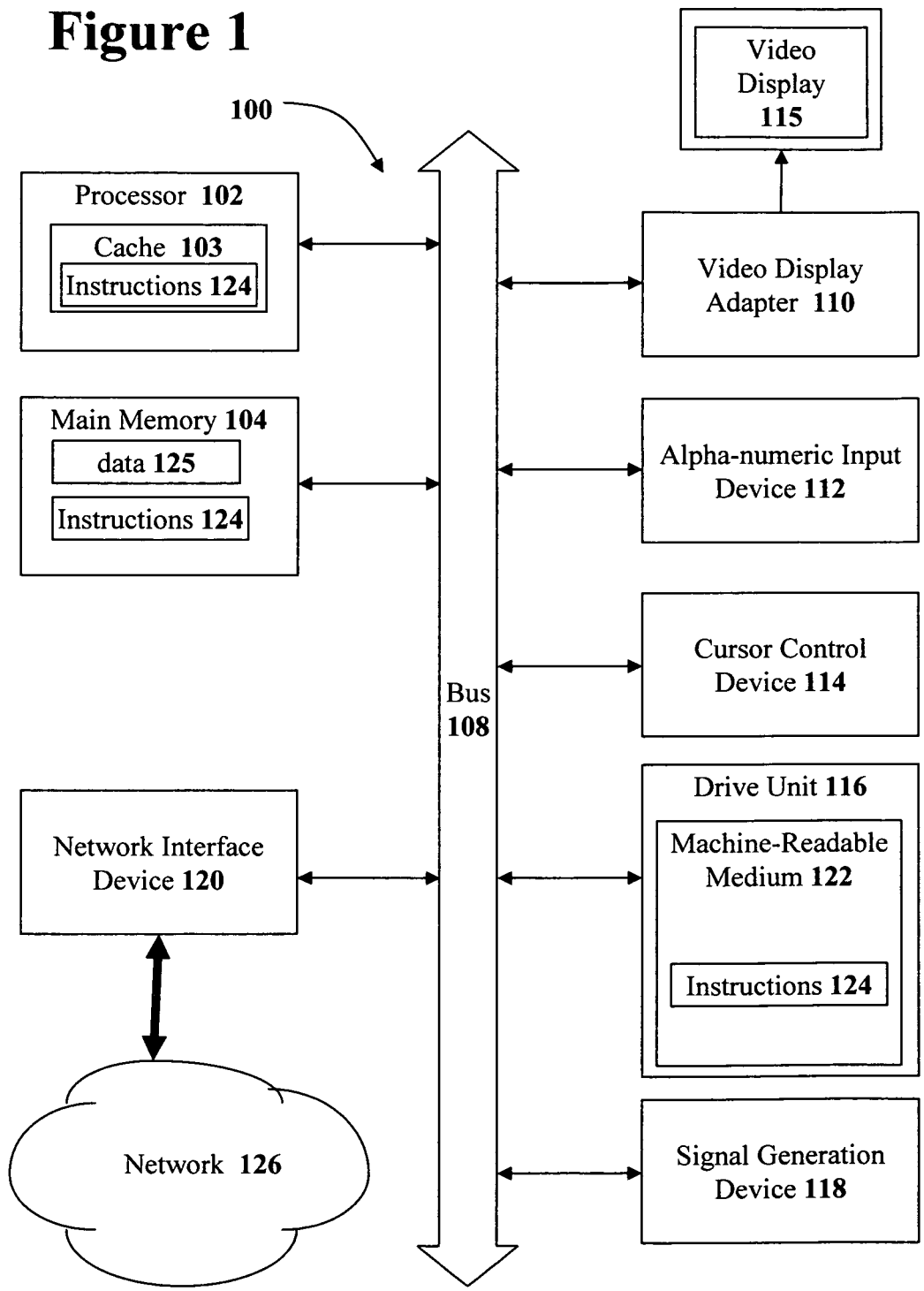
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both) and a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120. Note that not all of these parts illustrated in FIG. 1 will be present in all embodiments. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within a cache memory 103 associated with the processor 102. The main memory 104 and the cache memory 103 associated with the processor 102 also constitute machine-readable media. The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Concurrent Memory System Operations

To improve throughput, some memory systems allow more than one memory operation to be performed in each memory cycle. For example, a memory system may accept both a read request and write request in a single memory cycle. The memory system must then fully handle both the memory read and the memory write during the memory cycle and be ready to accept new memory requests in the subsequent memory cycle.

To handle simultaneous memory read and memory write operations, a memory system may be constructed entirely with dual-ported memory that can handle both a read and a write operation simultaneously. However, dual port memory circuits tend to have a low memory density, consume a lot of power, and are expensive. Thus, although dual-ported memory is very useful in various situations, it is generally impractical to construct a large memory system using dual-ported memory devices. Thus, other means of constructing a large memory system that can handle simultaneous memory read and memory write operations without so many disadvantages are desirable.

Another method of constructing a large memory system that can handle simultaneous memory read and memory write operations is to create a memory system with several independent memory banks. In such a system, the memory system is constructed with multiple different memory banks wherein each different memory bank can operate fully independently of the other memory banks. Therefore, as long as the memory read and memory write operations are directed toward different memory banks, the memory read and memory write operations can easily be handled simultaneously by the two different memory banks that operate independently. However, when the simultaneous memory read and memory write operations are directed toward memory addresses located within the same memory bank, a memory bank conflict occurs and thus the two memory access requests cannot be handled simultaneously by the one memory bank. Therefore, the memory system must have another system for handling the occurrence of such memory bank conflicts. The following sections disclose different methods of addressing this problem.

A Cache System for Handling Memory Bank Conflicts

A first system for handling memory bank conflicts in a memory system that handles simultaneous memory read and memory write operations is to use a cache memory in the memory controller to handle potential memory bank conflicts. Specifically, when simultaneous memory read and memory write operations attempt to access memory addresses located in the same memory bank, the memory controller will use a cache memory in the memory controller to prevent a memory bank conflict from occurring. Note that in this system, the cache memory does not respond to memory access requests faster than the main memory banks as most cache memory systems operate. Instead, the cache memory system is only used to prevent potential memory bank conflicts.

Figure 2:
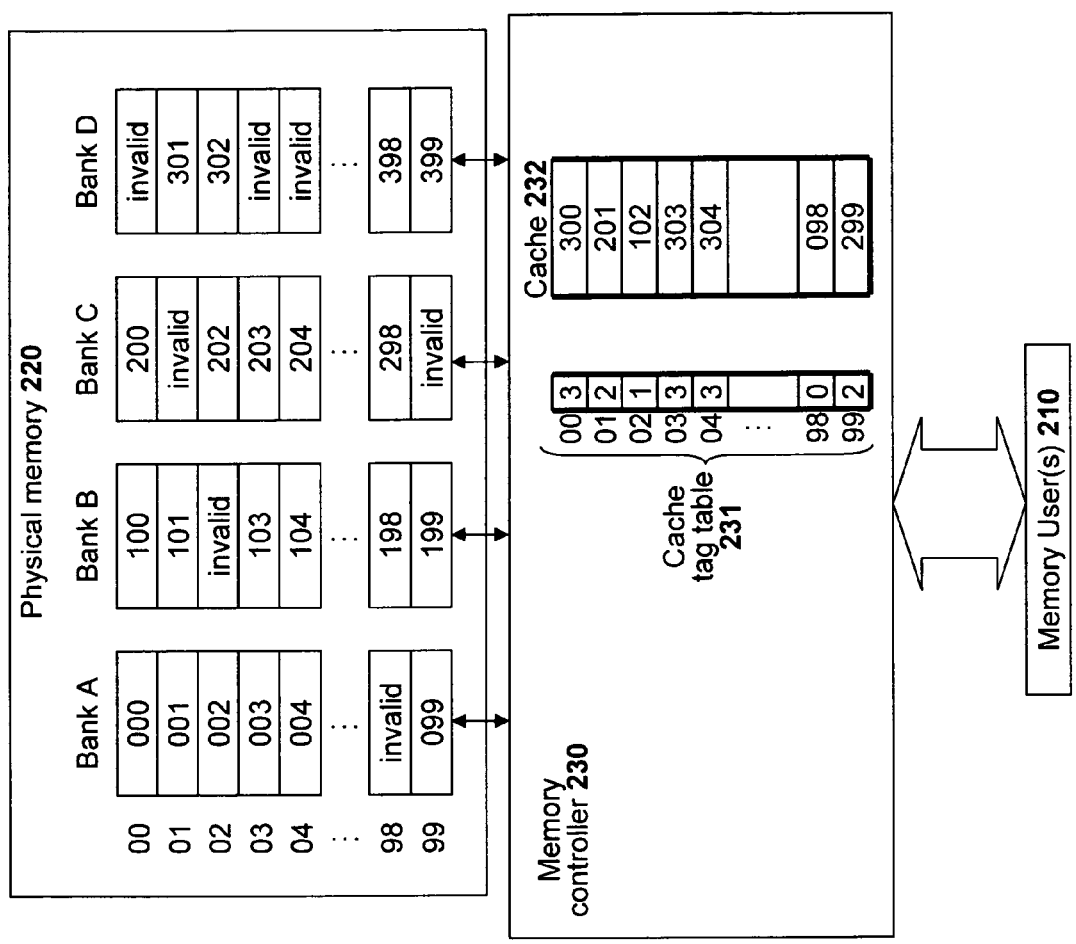
FIG. 2 illustrates a conceptual block diagram of a memory system for handling simultaneous memory read and memory write operations that uses a cache memory to prevent memory bank conflicts.

FIG. 2 illustrates a conceptual diagram of a memory system 200 for handling simultaneous memory read and memory write operations that uses a cache memory to prevent memory bank conflicts. Referring to FIG. 2, the memory system 200 accepts simultaneous memory read and memory write requests from memory user(s) 210 through a memory controller 230. The memory system 200 includes a physical memory array 220 that is organized into four independent memory banks (Bank A to D) having 100 rows each. For ease of explanation, this document will refer to memory bank sizes and memory addresses with base 10 (decimal) numbers but most actual implementations would use an even multiple of 2 for a base 2 (binary) address system. The example depicted in FIG. 2 and in the following description will provide specific numbers of memory banks, memory addresses, etc. However, it will be obvious to one skilled in the art that these are just numbers for this one particular example implementation. Various different memory system sizes may be constructed using very different numbers of memory banks, memory addresses, etc.

To handle the simultaneous memory access requests, the memory controller 230 accesses several independent memory banks (A to D in this example) in a physical memory system. As long as the simultaneous memory access requests are directed toward memory addresses located different memory banks, the memory controller 230 simply directs those memory access requests to the independent memory banks which handle the memory requests concurrently. For example, a memory read from address 001 and a memory write to address 104 can be handled by memory bank A and memory bank B independently.

When simultaneously received memory access requests are both directed toward memory addresses located in the same memory bank, the memory controller 230 handles the potential memory bank conflict using a cache memory system. The cache memory system is made up of a cache memory 232 that stores data and a cache memory tag table 231 that specifies what addresses are currently represented in the cache memory 232. If a particular address is represented in the cache memory 232 then that value in the cache memory 232 should be used since the value in the main physical memory is invalid.

Figure 3:
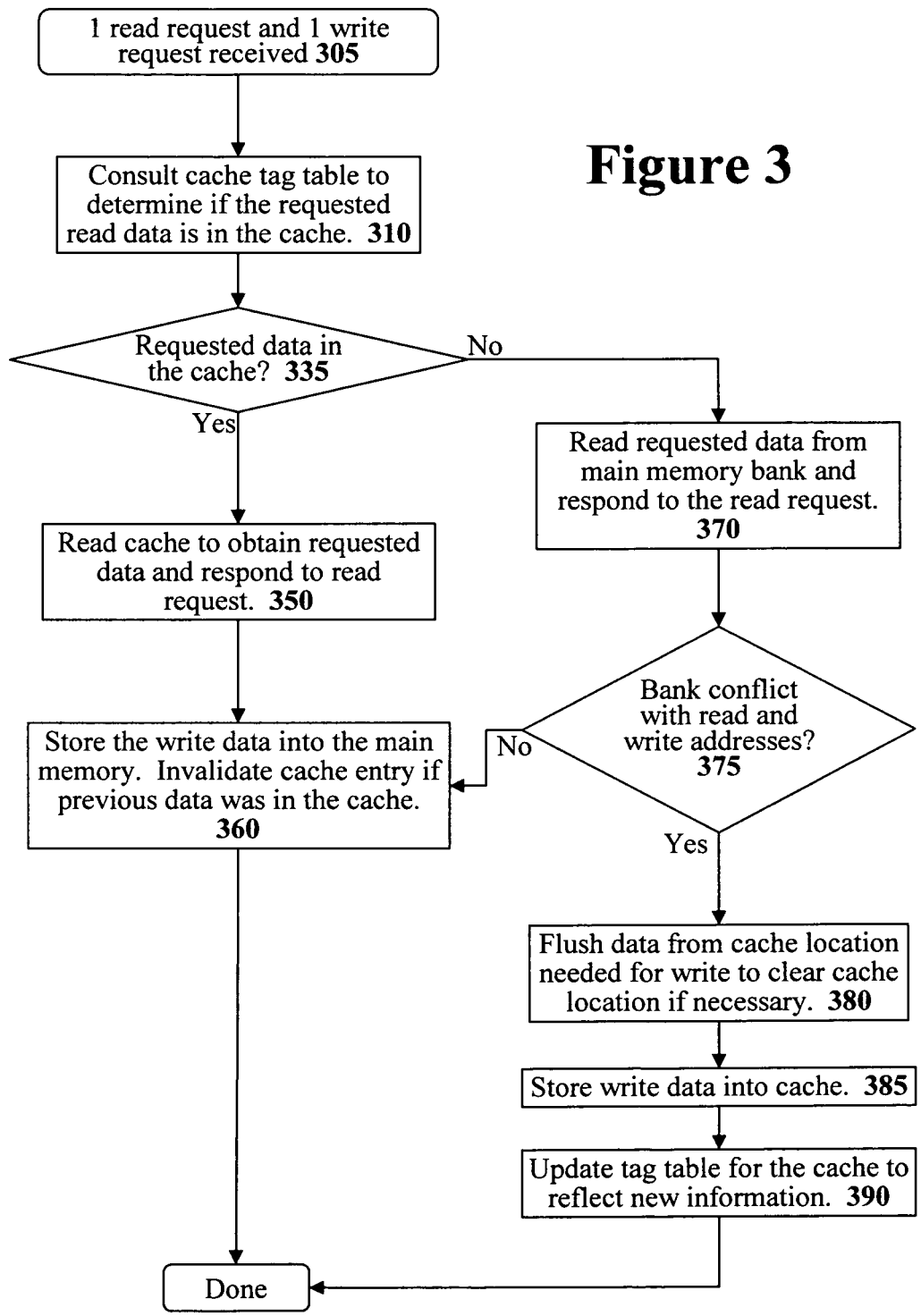
FIG. 3 illustrates a flow diagram describing the operation of the memory system depicted in FIG. 2.

The operation of the memory system 200 of FIG. 2 will be described with reference to a flow diagram in FIG. 3 and examples in FIGS. 4A to 4D. Note that the flow diagram of FIG. 3 is simplified for explanation purposes. A real embodiment may perform some steps in different orders or in parallel.

Referring to FIG. 3, a memory read request and memory write request are received at stage 310. The memory controller 230 then accesses the cache memory tag table 231 at stage 310 using the address of read request. Using the tag value read from the cache memory tag table 231, the memory controller 230 determines if the data addressed in the read request is in the cache memory at stage 335.

If stage 335 determines that the data addressed in the read request is in the cache memory then the system proceeds to stage 350 where the memory controller reads the cache memory 232 to obtain the requested data and responds to the read request with that data. Then the memory controller 230 stores the data associated with the write request into the main memory at stage 360. If the address associated with the write request was previously represented in the cache memory then the memory controller 230 invalidates that entry by marking the associated entry in the cache memory tag table 231 as invalid.

Figure 4B:
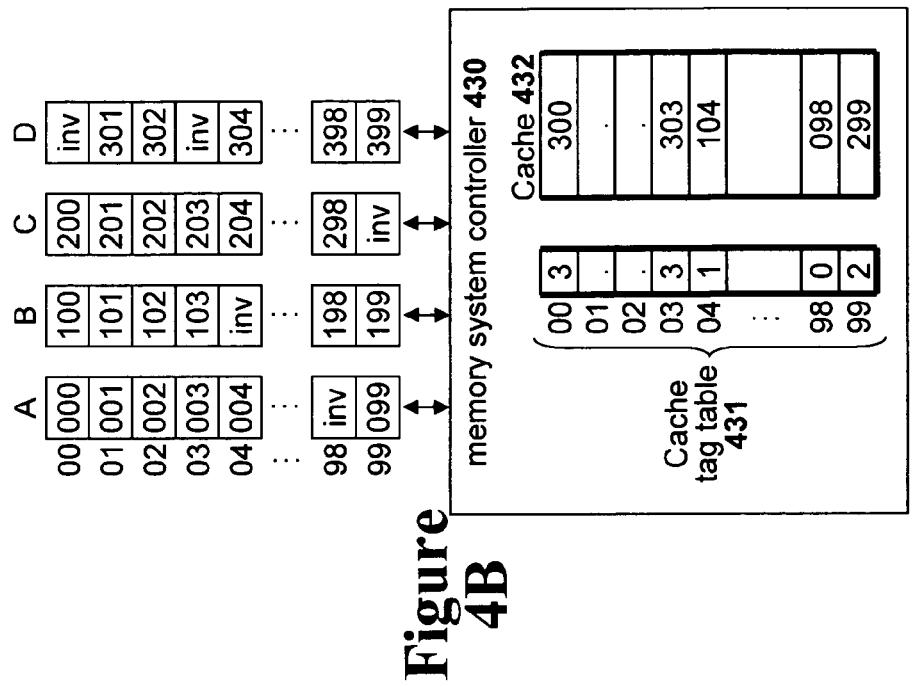
FIG. 4B illustrates the memory system of FIG. 4A after processing the read request and the write request.
Figure 4A:
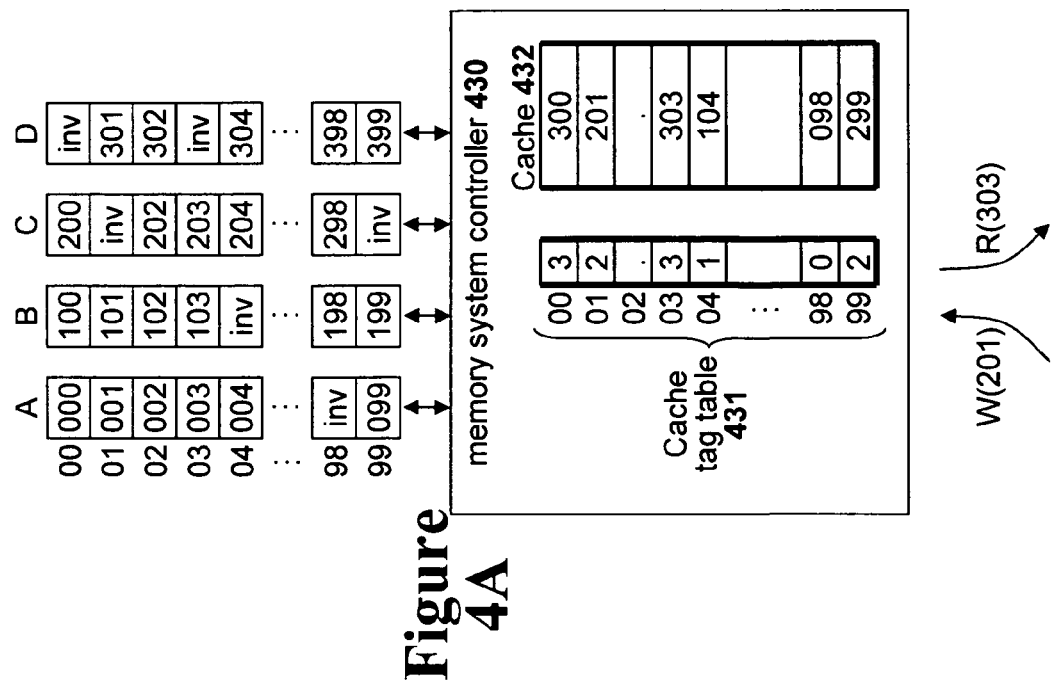
FIG. 4A illustrates a starting state for an example operation of the memory system of FIG. 2 receiving a read request and a write request.

An example of this operation is illustrated in FIGS. 4A and 4B. FIG. 4A illustrates an example state of the memory system 200 when it receives a read request for address 303 and a write request to address 201. The memory controller 430 accesses the cache memory tag table 431 and determines that the requested read data (address 303) is in the cache memory 432 and thus responds to the read request with the data read from cache memory 232. The write request to address 201 is handled by writing appropriate address in the main memory. In this case, address 201 was previously represented in the cache memory 232 such that the memory controller 430 invalidates the associated entry in the cache memory tag table 231 such that a later read request to address 201 will obtain the data from the main memory. Note that if the write had been to an address located in the same memory bank of the read request (bank D in this example), the write would have been handled in the same manner since no memory bank conflict occurred since the read request was handled using data in the cache memory 232.

Referring back to stage 335 in FIG. 3, if the address in the read request was not represented in the cache memory, then the system would proceed to stage 370 where the memory controller 230 would read the requested read data from the main memory and respond to the read request. At stage 375, the system determines if the write request is to an address in the same memory bank as the address in the read request and thus causes a memory bank conflict. If there is no memory bank conflict, the system can proceed to stage 360 where the memory controller 230 stores the data associated with the write request into the main memory. This is the trivial case where two independent memory banks are able to handle the read and write independently.

However, when the memory controller 230 determines at stage 375 that the write address is in the same memory bank used to service the read request then there is a potential memory bank conflict. To prevent the memory bank conflict, the memory controller 230 uses the cache memory 232. The memory controller 230 first flushes the current data from the cache memory 232 for the entry used to store data associated with the write address at stage 380. If there was not any valid data in that entry of the cache memory 232 then no flush needs to be performed. The memory controller 230 then writes the data from the write request into the cache memory 232 at stage 385. Finally, the memory controller 230 updates the cache memory tag table 231 to indicate that the valid data for the address associated with the write request is now stored in the cache memory 232.

Figure 4D:
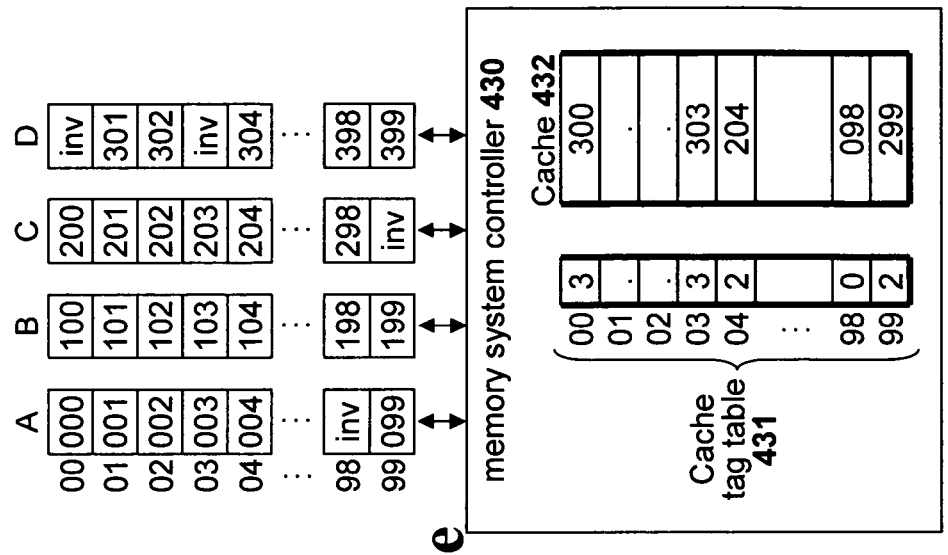
FIG. 4D illustrates the memory system of FIG. 4C after processing the read request and the write request.
Figure 4C:
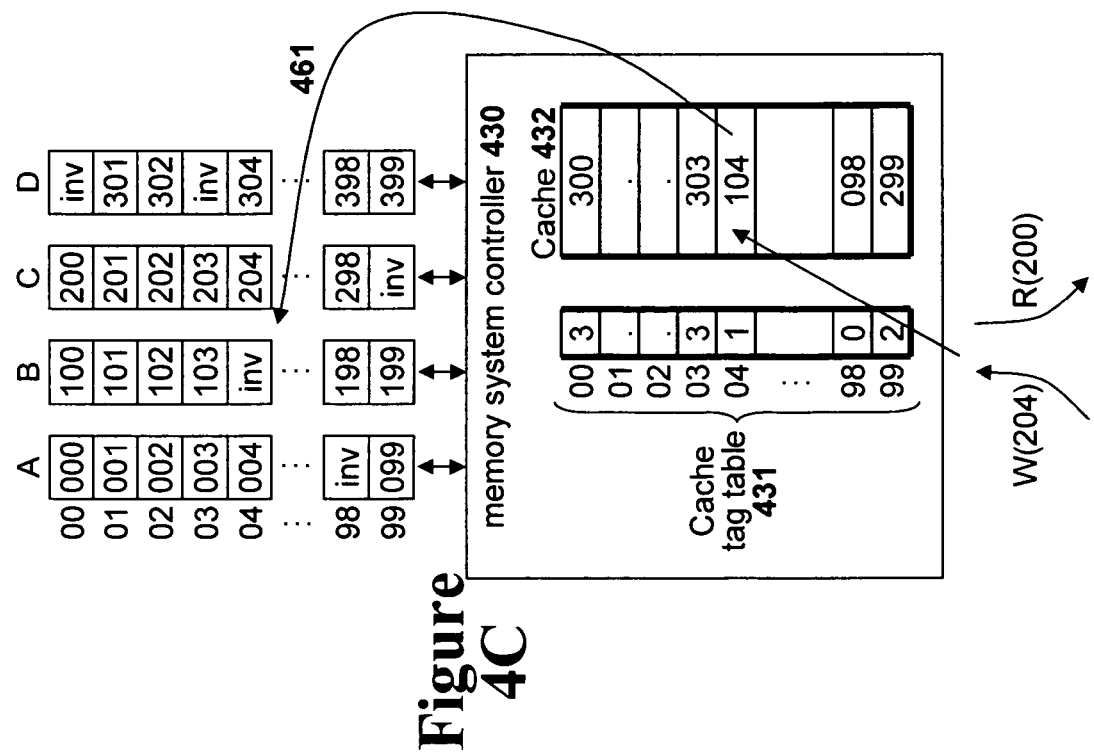
FIG. 4C illustrates the memory system of FIG. 4B receiving a new read request and write request.

FIGS. 4C and 4D illustrate an example of this memory bank conflict prevention operation. FIG. 4C illustrates the state of the memory system from FIG. 4B when it receives a read request for address 200 and a write request to address 204 which both would normally reside in memory bank B. As described in stage 335 of FIG. 3, the memory controller 430 accesses the cache memory tag table 431 and determines that the requested data is not in the cache memory 432 such that the memory controller proceeds to stage 370. At stage 370, the memory controller 430 reads address 200 from the memory bank C and responds to the read request with the data read from address 200 of memory bank C.

Next, at stage 375 the memory controller 430 determines if the concurrent write operation would conflict with the read operation (from address 200 in this example). In this case, the write request to address 204 in memory bank C conflicts with the read from address 200 in memory bank C. Thus, the memory controller 430 proceeds to stage 380 to proceed with the store the data from the write request to address 204 into the cache memory 432. However, the 04 row of the cache memory 432 may currently contain valid data. Thus, the memory controller 430 flushes the 04 row cache entry that will be used to store the data associated with the write to address 204 if it contains valid data at stage 380. In this case, the data from address 104 was represented in the 04 row entry of cache memory 432 such that the memory controller 430 flushes the data to address 104 in the main memory. Note that this will not conflict with the read from address 200 in bank C since the flush accesses address 104 in memory bank B. (The only possible entry in the 04 row entry in the cache memory 432 that would conflict with the read from address 200 would be the address 204 wherein the memory controller would simply over-write the existing data value for address 204 stored in the cache memory 432 such that no flushing is required or even possible.)

Next, at stage 385, the memory controller 430 writes the data for address 204 into the cache memory 432 where the data from address 104 was flushed from. Finally, at stage 390, the memory controller 430 updates the associated 04 row entry in the cache memory tag table 431 to reflect that address 204 is now stored in the cache memory 432. Note that many of these stages may occur in parallel in an actual implementation.

It should be noted that unusual situation that may occur is when both the read request and the write request specify the exact same address. Normally, a memory user should never issue such a pair of simultaneous requests since there is really no reason to read an address when that same address is being written to by the same entity. However, if such a case occurs, the system may be configured to respond to the read request with the original data already existing in the memory system 200 or the new data contained in the write request.

The cache system of FIG. 2 works well to prevent memory bank conflicts as disclosed in the examples of FIG. 4A to 4D. However, the cache memory system of FIG. 2 is expensive to implement since it requires a high-speed dual-ported cache memory system that is the size of a full memory bank. Furthermore, the case depicted in FIG. 4C that requires a flush from the cache memory 432 while also handling a write to the very same row entry of cache memory 432. This may be implemented using various techniques but this can introduce undesirable latency and require costly circuits.

Virtualized Memory System for Handling Memory Bank Conflicts

Figure 5:
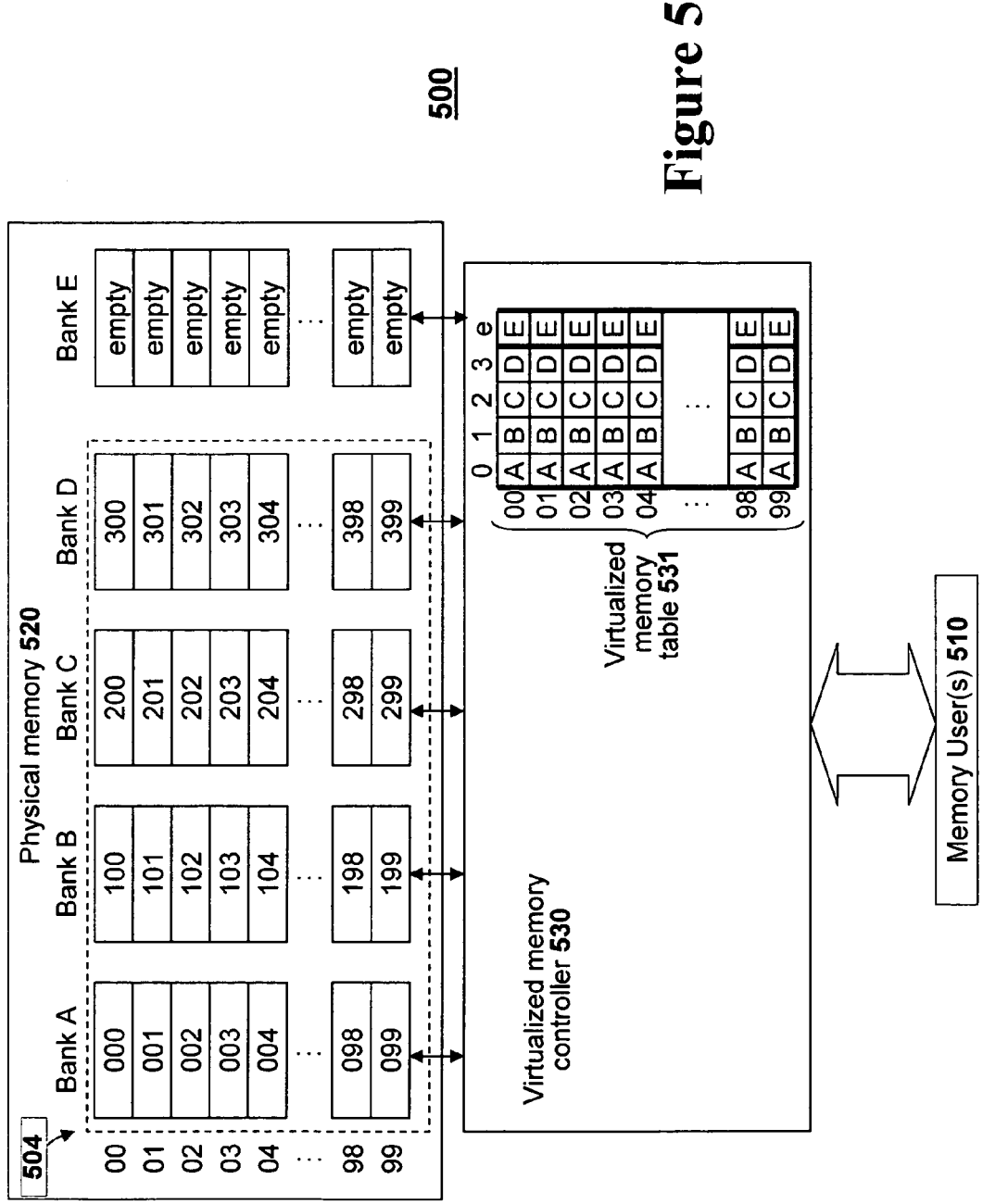
FIG. 5 illustrates a conceptual block diagram of a virtualized memory system for handling simultaneous memory read and memory write operations that uses an extra memory bank to prevent memory bank conflicts.

To construct a memory system that does not require a costly dual-ported cache memory system 432 that is as large as the memory banks (A, B, C, and D), a "virtualized memory system" was introduced in a patent application filed on Sep. 8, 2009 entitled "SYSTEM AND METHOD FOR STORING DATA IN A VIRTUALIZED HIGH SPEED MEMORY SYSTEM" having Ser. No. 12/584,645 which is hereby incorporated by reference. The virtualized memory system remaps virtualized addresses into physical memory addresses in a manner that prevents memory bank conflicts from occurring. FIG. 5 illustrates a block diagram of such a virtualized memory system 500. The virtualized memory system 500 mainly consists of a virtualized memory system controller 530 having a virtualized memory table 531 and physical memory array 520.

Referring to FIG. 5, the physical memory array 520 is organized into five independent memory banks (Bank A to E) having 100 rows each such that there are 500 unique physical memory addresses in the physical memory 520. Note that this is similar to the memory system 200 of FIG. 2 except that it includes one additional memory bank. The extra memory bank will be used to handle potential memory bank conflicts.

The virtualized memory system 500 presents a virtualized memory address space to users of the virtualized memory system 500 that is smaller than the actual physical address space. An initial virtual memory address space 504 (surrounded by a rectangle made of dotted lines) comprising virtualized memory addresses 000 to 399 is represented within physical memory banks A to D. Physical memory bank E does not initially represent any of the virtualized memory locations such that memory bank E's memory locations are marked 'empty'. In the virtualized memory system example of FIG. 5, this document will specify a virtualized memory address that is currently being represented by a physical memory location as a three-digit virtualized memory address within the box of the physical memory location. For example, the physical memory location at row 00 of Bank B initially represents virtualized memory address 100 such at '100' is depicted within the box at row 00 of memory bank B. As will be shown later in this document, the actual locations of the various virtualized memory addresses will move around in the physical memory space 520. Thus, the virtual memory address space 504 organization depicted in FIG. 5 only represents one possible state of many.

The virtualized memory system controller 530 is responsible for handling all virtualized memory access requests from the memory user(s) 510. The memory system controller 530 translates virtualized memory addresses (the 000 to 399 addresses in FIG. 5) into actual physical memory addresses (identified in FIG. 5 by the memory bank letter and the row within that memory bank) within the physical memory 520. To accomplish this virtualized address to physical address translation task, the memory system controller 530 uses at least one virtualized memory mapping table 531.

In the virtualized memory system embodiment of FIG. 5, virtualized memory addresses are split into a most significant digit (the first digit of a three digit virtualized address) and two least significant digits (the second two digits of a three digit virtualized address). In, the specific embodiment of FIG. 5, the virtualized memory system uses the least significant digits of virtualized memory address (the second two digits of the virtualized memory address) as the physical row designation in the physical memory system. Thus, there is no translation needed for the two least significant digits of the virtualized memory address since they are the same as the two least significant digits of the physical memory address. Other implementations may use other address translation schemes.

The most significant digit of a virtualized memory address must still be translated into a physical memory address. In the system of FIG. 5, the most significant digit of a virtualized memory address is translated into a physical memory bank. To perform the address translation, the virtualized memory mapping table 531 includes a number of rows equal to the number of rows in the memory banks and a number of columns equal to the number of most significant address digit possibilities (0, 1, 2, and 3 in this example of a virtualized address space from 000 to 399). To translate from the virtualized memory address to the physical memory location, the virtualized memory system controller 530 examines the entry of the virtualized memory mapping table 531 having the same row of the virtualized memory address' two least significant digits and the same column as the virtualized memory address' most significant digit. For example, to translate virtualized address 304 to a physical memory location, the virtualized memory system controller 530 consults the entry of column '3' and row '04' of the virtualized memory mapping table 531 to obtain 'D' as the memory bank that currently represents virtualized address 304 (in row 04).

In addition to the 0 to 3 columns, the virtualized memory mapping table 531 embodiment of FIG. 5 also includes a column labelled "e". This column is used to identify a memory bank containing an empty memory location at the designated row. For example, row '02' of column 'e' in the virtualized memory mapping table 531 lists 'E' (memory bank E) as a memory bank with an empty location for addresses with the least significant digits of '02'. However, this column need not be implemented since the memory bank with an empty memory location in that particular row can be inferred by determining the memory bank designation (A, B, C, D, or E) not represented in the 0 to 3 columns of that same row.

The virtualized memory system 500 of FIG. 5 is configured to handle a read request to a first virtualized address with a simultaneous write request to any other address in the virtualized memory system 500 without ever forcing the memory user(s) 510 to stall due to a memory bank conflict. Thus, the virtualized memory system 500 provides a guaranteed memory bandwidth using ordinary memory such that all applications which require a guaranteed memory access time can use the virtualized memory system 500.

As set forth earlier, a multi-bank memory system with independent memory banks can easily handle multiple simultaneous memory access requests as long as the memory access requests are directed to different memory banks in the memory system. For example, referring to FIG. 5, a write request could write to Bank A and read request could simultaneously read from Bank C with no memory bank conflict since the two memory banks are independent. However, when two simultaneous memory access requests are directed to data represented in the same memory bank, then a potential memory bank conflict occurs.

The virtualized memory system controller 530 handles memory bank conflicts wherein a read operation and a write operation are simultaneously issued to the same memory bank by moving the virtualized memory address for the write operation to an unused memory location in a different memory bank. The unused memory location is determined by reading the virtualized memory table 531 to determine an unused memory location to handle the write request and then updating the virtualized memory table 531 with the new physical location of the virtualized memory address from the write request.

Figure 6:
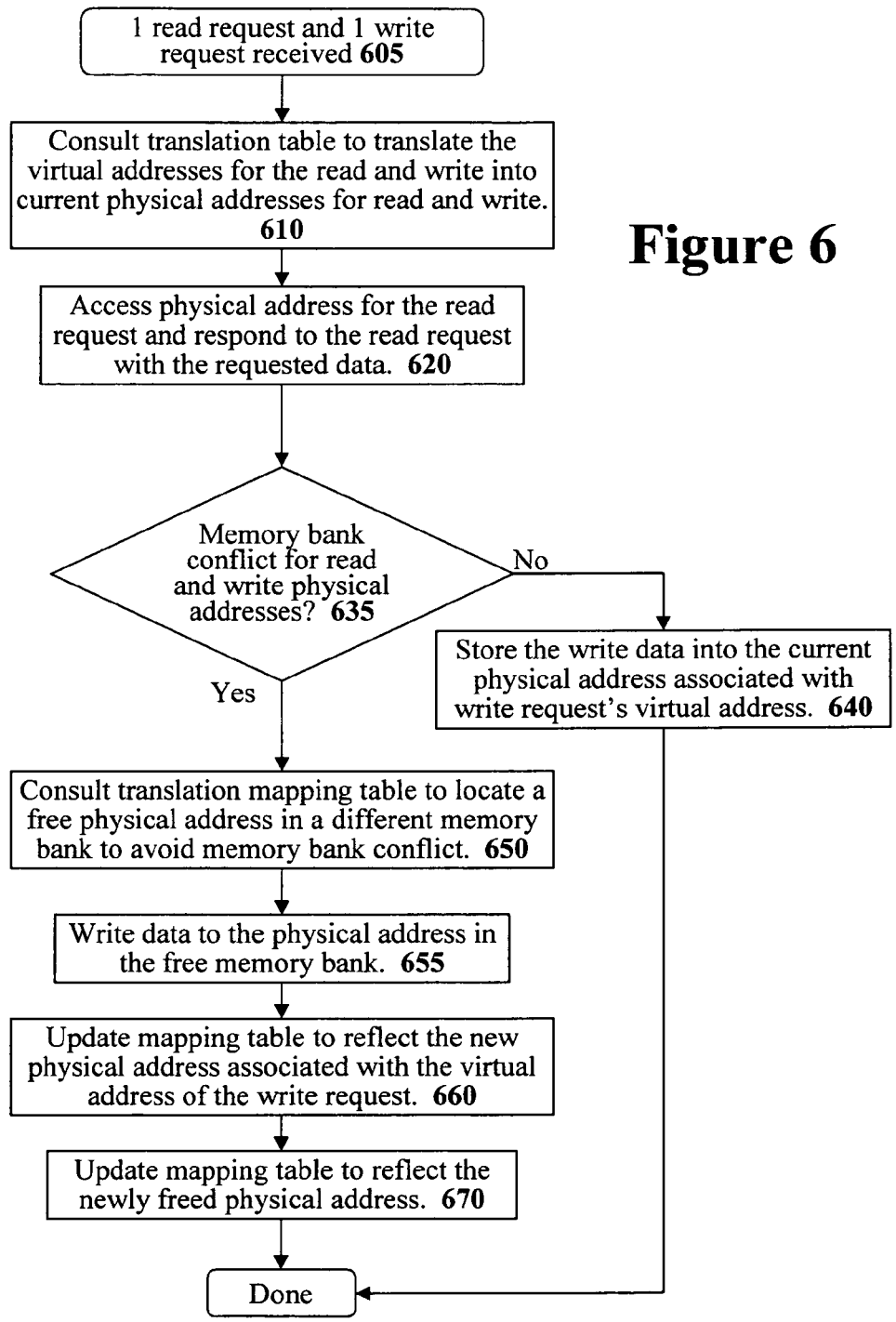
FIG. 6 illustrates a flow diagram describing the operation of the memory system depicted in FIG. 5.

The technique is best described with the use of examples. An example operation of the virtualized memory system 500 embodiment of FIG. 5 is set forth with reference to FIG. 6 and FIGS. 7A to 7D. The operation will be set forth with reference to the flow diagram of FIG. 6. The flow diagram of FIG. 6 is used to explain the system in a simplified manner. In a real implementation, some stages (such as the table look-ups in stages 610 and 650) may be performed in parallel.

Figure 7B:
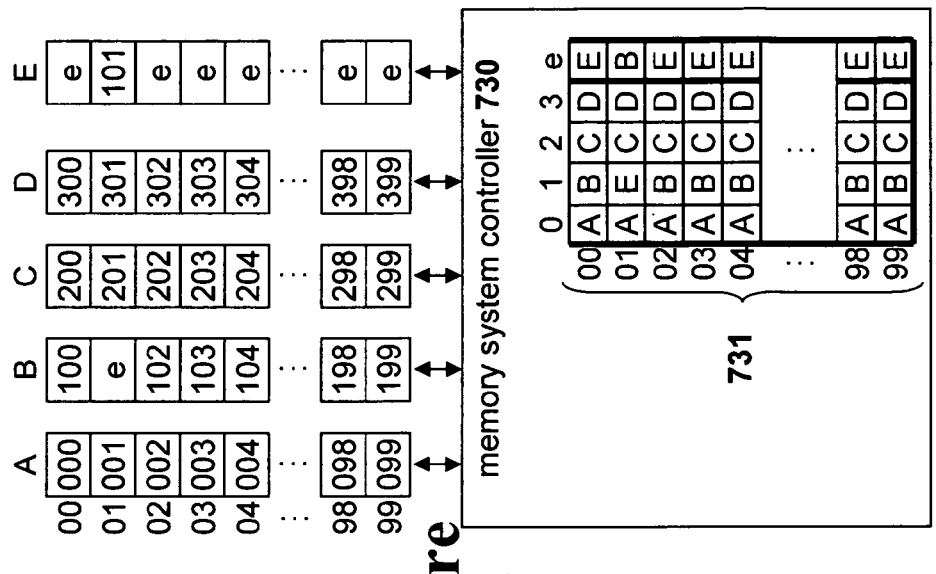
FIG. 7B illustrates the memory system of FIG. 7A after processing the read request and the write request.
Figure 7A:
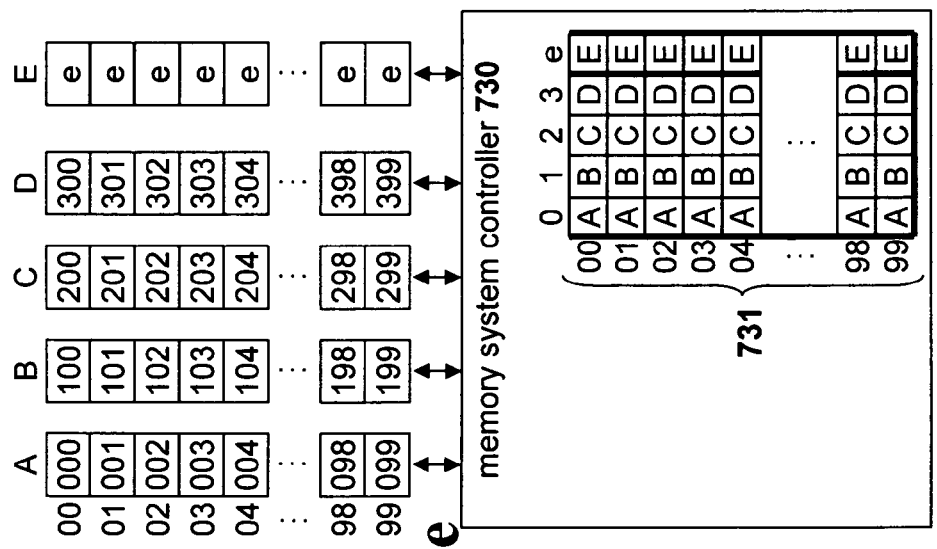
FIG. 7A illustrates a starting state for an example operation of the memory system of FIG. 5 receiving a read request and a write request.

FIG. 7A illustrates the same virtualized memory system of FIG. 5 in the same initial condition. If the virtualized memory system controller 730 simultaneously receives a memory write to virtualized address 101 and a memory read to virtualized address 103 this memory access pattern would normally cause a memory bank conflict since both virtualized address 101 and 103 are in the same memory bank (memory bank B). To prevent the memory bank conflict, the virtualized memory system controller 730 allows the read of virtualized address 103 to proceed as normal from physical memory bank B but handles the write to virtualized address 101 using a different memory bank. This can be done since the data currently residing in the memory location currently associated with virtualized address 101 is no longer relevant since a new data value is being written to virtualized address 101.

Initially, at stage 605, the virtualized memory system controller 730 in FIG. 7A receives a read request for address 103 and a write request to address 101. Next, at stage 610, the virtualized memory system controller 730 consults the virtualized memory table 731 to determine the current physical location of virtualized address 103 associated with the read request. The most significant digit is used to select a column and the two least significant digits are used to select a row to locate an entry in the virtualized memory table 731. That entry of virtualized memory table 731 specifies that virtualized address 103 is current located in memory bank B. Thus, the virtualized memory system controller 730 reads the identified physical memory location and responds to the read request with the data at stage 620. Again, it must be emphasized that these examples are only being presented in decimal form to simplify the explanation and a normal implementation would use binary numbers. Furthermore, many other look-up table designs (such as different address bits associated with the rows and columns) may be used to accomplish the same result as the specific virtualized memory table 731 example depicted in FIG. 7A.

The virtualized memory system controller 730 consults the virtualized memory table 731 to determine the current physical location of the virtualized address 101 specified in the write request. Consulting virtualized memory table 731, it can be seen that virtualized address 101 is currently in memory bank B. Next, at stage 635, the system determines if this location would cause a memory bank conflict with the read operation. If the write had been to a memory location in a different memory bank (such as address 200 in bank D) then the write could be performed using that physical location in a different memory bank in parallel with the read operation at stage 640 and thus completing both memory operations independently. However, in this example, virtualized address 101 is currently located in memory bank B thus creating a potential a memory bank conflict with the read of virtualized address 103 that is also currently located in memory bank B.

To prevent the potential memory bank conflict between addresses 101 and 103, the system proceeds to stage 650 where the virtualized memory system controller 730 consults the "e" column of the 01 row in the virtualized memory table 731 to determine the physical location of an available memory bank to store the data for the write to virtualized address 101. Row 01 of column "e" in virtualized memory table 731 specifies memory bank E as being available. Thus, the virtualized memory system controller 730 stores the write request data into row 01 of memory bank E. (The actual data value is not shown in FIG. 7 since the actual data value does not matter for this discussion.)

Since the physical location representing virtualized memory address 101 has moved, the virtualized memory table 731 must be updated to reflect the new physical location of virtualized address 101. Thus at stage 660, the virtualized memory system controller 730 writes "E" into row 01 of the 1 column in the virtualized memory table 731.

Similarly, the new free memory bank associated with the 01 row must be updated. Therefore, at stage 670, the virtualized memory system controller 730 writes "B" into row 01 of the "e" (empty) column in the virtualized memory table 731. Note that this step does not need to be performed in implementations where the free memory bank is inferred by determining the memory bank not listed in the 0, 1, 2, or 3 columns of a particular row. At this point, both the read operation to address 103 and the write operation to address 101 have been performed without stalling the memory user(s) that issued the memory access requests.

Figure 7D:
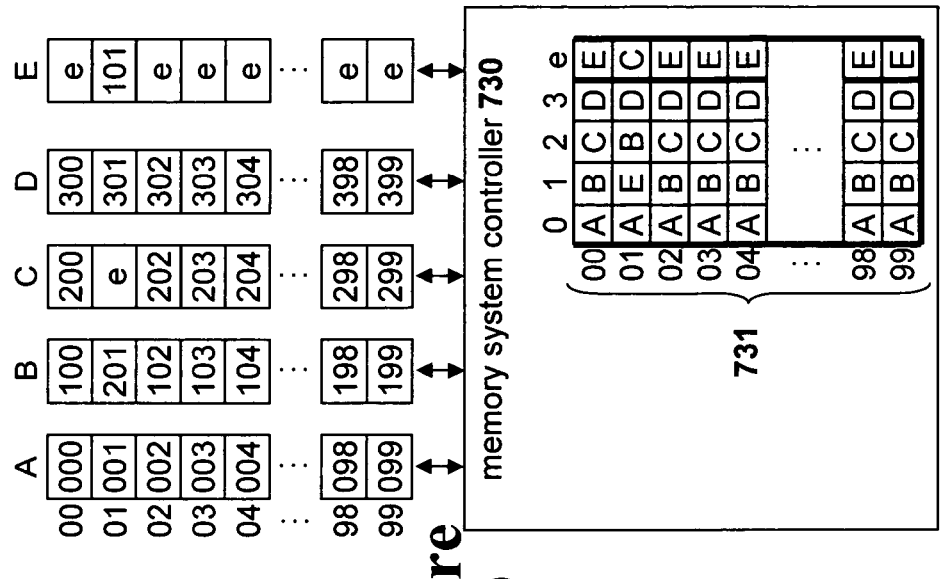
FIG. 7D illustrates the memory system of FIG. 7C after processing the read request and the write request.
Figure 7C:
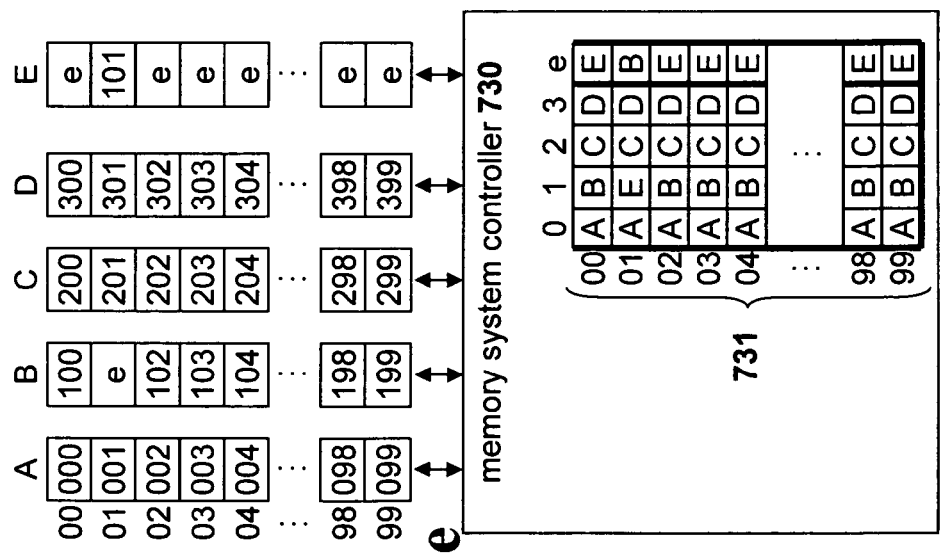
FIG. 7C illustrates the memory system of FIG. 7B receiving new a read request and write request.

A second example of a simultaneous read operation and write operation is provided with reference to FIGS. 7C and 7D. FIG. 7C uses the state of the memory system in FIG. 7B as a starting point. The system of FIG. 7C then receives both a write to virtualized address 201 and a read from virtualized address 204. To perform the read of virtualized address 204, the memory controller 730 first determines the location of virtualized address 204 in the physical memory. Thus, the memory controller 730 first reads out the entry at column 2 of row 04 in virtualized address table 731 that specifies that virtualized address 204 is currently located in memory bank C. Thus, the memory controller 730 reads the data for virtualized address 204 out of the physical memory location at 04 row of memory bank C to handle the read request.

To handle the write to virtualized address 201 (which is currently stored in the 01 row of column C thus causing a potential memory bank conflict with the read from row 04 of memory bank C), the memory controller 730 reads the entry from the "e" column in row 01 of virtualized address table 731 to determine that the free memory bank for row 01 is available in memory bank B. Thus, the data associated with the write to location 201 is placed in row 01 of physical memory bank B as depicted in FIG. 7D. The memory controller 730 then updates table 731 to reflect the new location of virtual address 201 (by writing "B" in entry at row 01 of column 2) and the location of the new free memory location for row 01 (by writing a "C" in the entry at "e" column of row 01.

As can be seen from the above two examples, the virtualized memory system will always have at least two locations where it can perform a write for any virtualized address: the current location of that virtualized address or the memory bank for that row designated as empty. If an incoming write request does not cause a memory bank conflict with a simultaneous read, then the virtualized memory controller 730 may store the data in the current location physical location that represents the virtualized address. However, if there is a potential memory bank conflict caused by a read request and write request directed toward the same memory bank, then the virtualized memory controller 730 will write the data into a different physical memory bank having an empty location for that row and update the new location of that virtualized memory address in the virtualized memory table 731. In the example implementation depicted, the lowest two digits of the virtualized address space location will always designate the row in the physical memory space. However, in a real digital implementation, a subset of bits from the virtualized memory address may be used (such as a set of least significant bits of the virtualized memory address). Furthermore, there are many other variations upon this design as set forth in the application that has been incorporated by reference.

Memory Latency Issues

Both the cache type of implementation disclosed in FIG. 2 and the virtualized memory type of implementation disclosed in FIG. 5 hide the effects of any potential memory bank conflict from the user(s) of the respective memory systems. However, both of these two memory systems introduce an undesirable latency into the memory system. Specifically, both the cache type implementation of FIG. 2 and the virtualized memory type implementation of FIG. 5 require a look-up into some type of translation table before responding to the incoming read request with a result. This table look-up that must be performed before a response is provided to the read request introduces undesirable latency that may be unacceptable in various applications that require a fast data response time.

Referring back to FIG. 2, in the cache memory based implementation of the memory system 200 the memory controller 230 must first access the cache tag table 231 to determine if the requested read data is located in the cache memory 232 or in the main physical memory 220. The cache tag table 231 specifies which memory bank (if any) has data from the corresponding location represented in the cache memory 232. After determining whether the requested data is in the cache memory 232 or in the main memory 220, the memory controller 230 reads the data from the designated location and responds to the read request. This look-up into the cache tag table 231 adds latency into the memory read performance.

Referring back to FIG. 5, in the virtualized memory system the virtualized memory controller 530 must access the virtualized memory table 531 in order to locate the current location of the data as requested by the data's virtual address. The memory controller 530 then accesses the specified memory bank (A, B, C, D, or E) in the physical memory 520 to read the data and respond to the read request. Thus, the virtualized memory table 531 adds latency into the memory read performance.

In many applications that require a fast response to memory requests, the added latency from the cache tag table look-up or the virtualized memory table look-up will render these types of memory systems inadequate. Therefore other methods of constructing a memory system for such applications are needed. For example, a memory system may be constructed entirely out of high-speed SRAM in order to provide the needed performance. However, using a memory system constructed entire from SRAM memory uses a large area of chip real estate, uses more power than DRAM memory, and generates more heat than DRAM memory.

A Low Latency Cache Based Implementation

To reduce the latency in a memory system that can handle a simultaneous read and write requests in a single memory cycle without a memory bank conflict, the present disclosure introduces a new memory system controller. The new memory controller uses a cache memory to handle potential memory bank conflicts. However, the new memory controller uses the cache memory system in a novel manner that reduces latency.

FIG. 8 illustrates a block diagram of a memory system 800 that can reduce latency when handling complex multiple address memory requests. The memory system 800 of FIG. 8 is constructed from a main memory unit 820 and a memory controller 830. The main memory bank 820 is constructed from more than one memory bank (banks A, B, C, and D in this example) wherein each memory bank can operate independently from the other memory banks. The main memory 820 may be constructed with embedded DRAM (eDRAM), SRAM, a register file, FLOPS, any single port memory, or any other suitable memory. The memory controller 830 receives memory read and write requests from memory users 810 and responds so those requests using the main memory 820.

In addition to the main memory 820, the memory controller 830 uses other memory locations such as a cache memory 832, a cache tag table 831, a cache register 834, and a write register 835. The cache memory 832 and the associated cache tag table 831 may be constructed with embedded DRAM (eDRAM), SRAM, High-speed SRAM, 2-port SRAM, dual-port SRAM, a register file, Multiport SRAM, flip-flops, or any other memory circuitry that provides the required number of read and write ports. Note that in addition to directly using such types of memory circuits, those memory circuits may be used indirectly by combining those memory circuits with algorithmic memory controllers to obtain The layout of the cache memory 832 and the associated cache tag table 831 can affect the performance of the memory system. In some embodiments, the cache memory 832 and the associated cache tag table 831 may be implemented within the same physical memory system in order to reduce the layout area for the cache. In other embodiments, the cache memory 832 and the associated cache tag table 831 are kept separate from each other in order to reduce the power usage of the memory controller.

In the particular embodiment of FIG. 8, the memory system 800 is roughly similar to the cache-based memory system 200 of FIG. 2 that handles a simultaneous read and write requests. However, there are several differences in the memory system 800 that allow memory system 800 to operate with a lower latency than the memory system 200 of FIG. 2. A first difference from the memory system 200 of FIG. 2 is that the cache memory system 832 of the memory system 800 can handle two simultaneous read operations and a single write operation (related to a read operation from an earlier memory cycle as will be disclosed). In the particular embodiment of FIG. 8, the ability to handle two read operations is implemented using a duplicated cache table such that the cache memory 832 includes a first cache 838 and a second cache 839. The ability to handle two simultaneous read operations allows the memory system 800 of FIG. 8 to reduce latency in memory read operations. Other methods of providing the ability to handle two simultaneous read operations and a write operation may also be used to implement the reduced latency memory system of the present disclosure. Specifically, the U.S. Patent Application entitled "HIGH SPEED MEMORY SYSTEMS AND METHODS FOR DESIGNING HIERARCHICAL MEMORY SYSTEMS" having Ser. No. 12/802,631 that was filed on Aug. 17, 2010 discloses methods of creating memory that can handle simultaneous read operations and a write operation and is hereby incorporated by reference.

A second difference from the memory system 200 of FIG. 2 is that the memory system 800 includes a cache register 834 and a write register 835 that are used to delay the handling of write operations into a later memory cycle. This delay of the write operation resolving allows the memory controller 830 to be given a choice between flushing the value in the cache register 834 (that was read from the cache memory 832) or flushing the temporary write register 835 (that contains the data from the write request being resolved). In this manner, the memory controller 830 will always be able to resolve the write operation in some manner without conflicting with a current read operation.

In most cases, the memory controller 830 will resolve the write operation by writing one of these two register data values (the cache register 834 data value or the temporary write register 835 data value) back into the main memory 820 without conflicting with the current read operation. In one specific case, the data values in both the cache register 834 and the temporary write register 835 will conflict with the current read operation since both will represent an address within the same memory bank that the read operation is accessing. However, this can only occur when both the data in the cache register 834 and the temporary register 835 refer to the very same address. That particular case can be handled by having the value in the temporary write register 835 (the more recent version of the data for that address) overwrite the older data value in the cache memory 832.

The remaining differences between the memory system 200 of FIG. 2 and the low-latency memory system 800 of FIG. 8 are in how the memory controller 830 operates. The operation of the memory controller 830 will be set forth with reference to FIGS. 9A, 9B, 10A, and 10B. The flow diagram of FIG. 9A and the conceptual diagram of FIG. 10A illustrate how an incoming read request is handled in the memory cycle it was received and how the system prepares for handling the write request in the following memory cycle. The flow diagram of FIG. 9B and the conceptual diagram of FIG. 10B illustrate how a write request is handled in the following memory cycle while allowing a new read request to be handled simultaneously.

Figure 9A:
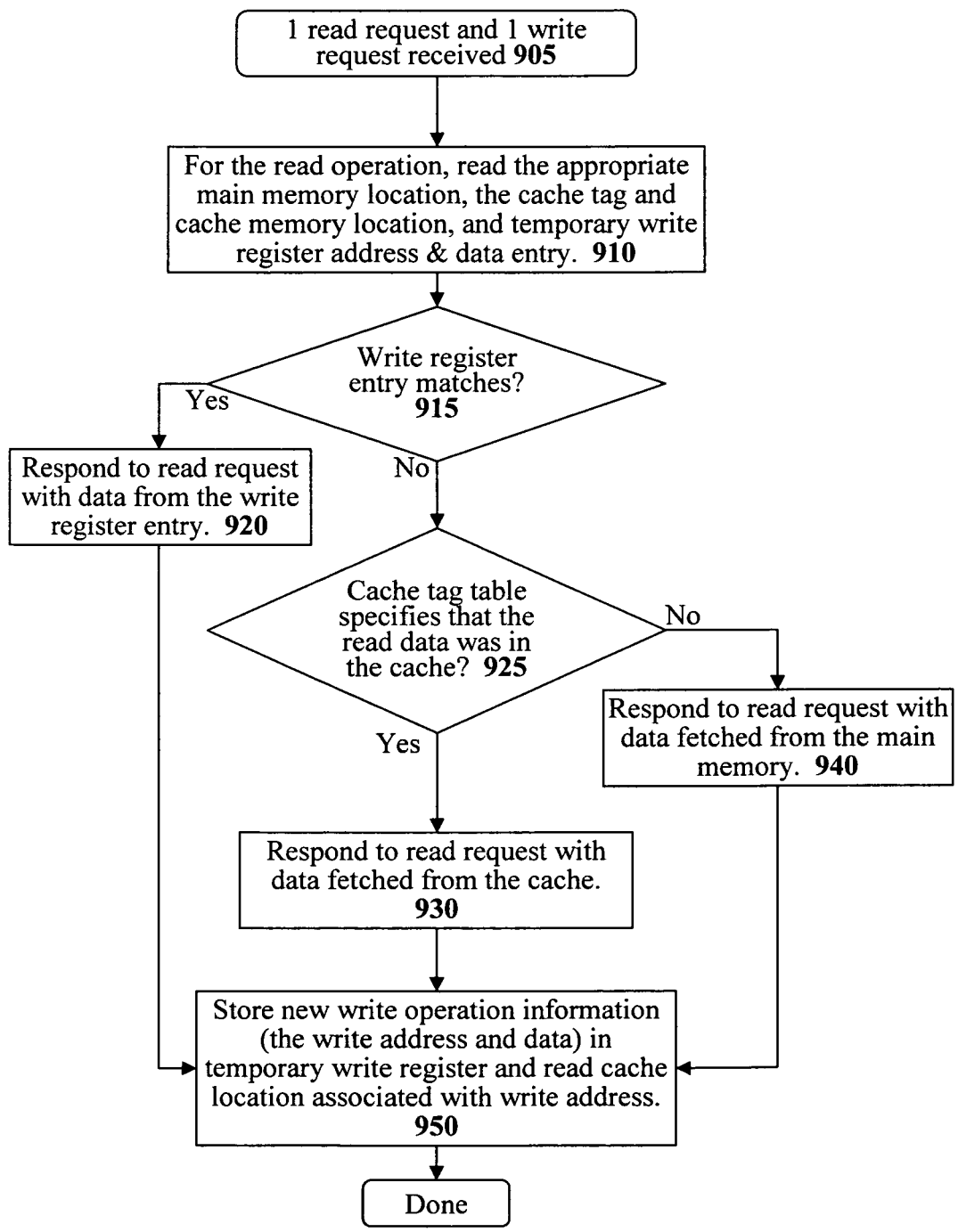
FIG. 9A illustrates a flow diagram describing the how the memory system depicted in FIG. 8 resolves read requests and preparations for resolving write requests.
Figure 10A:
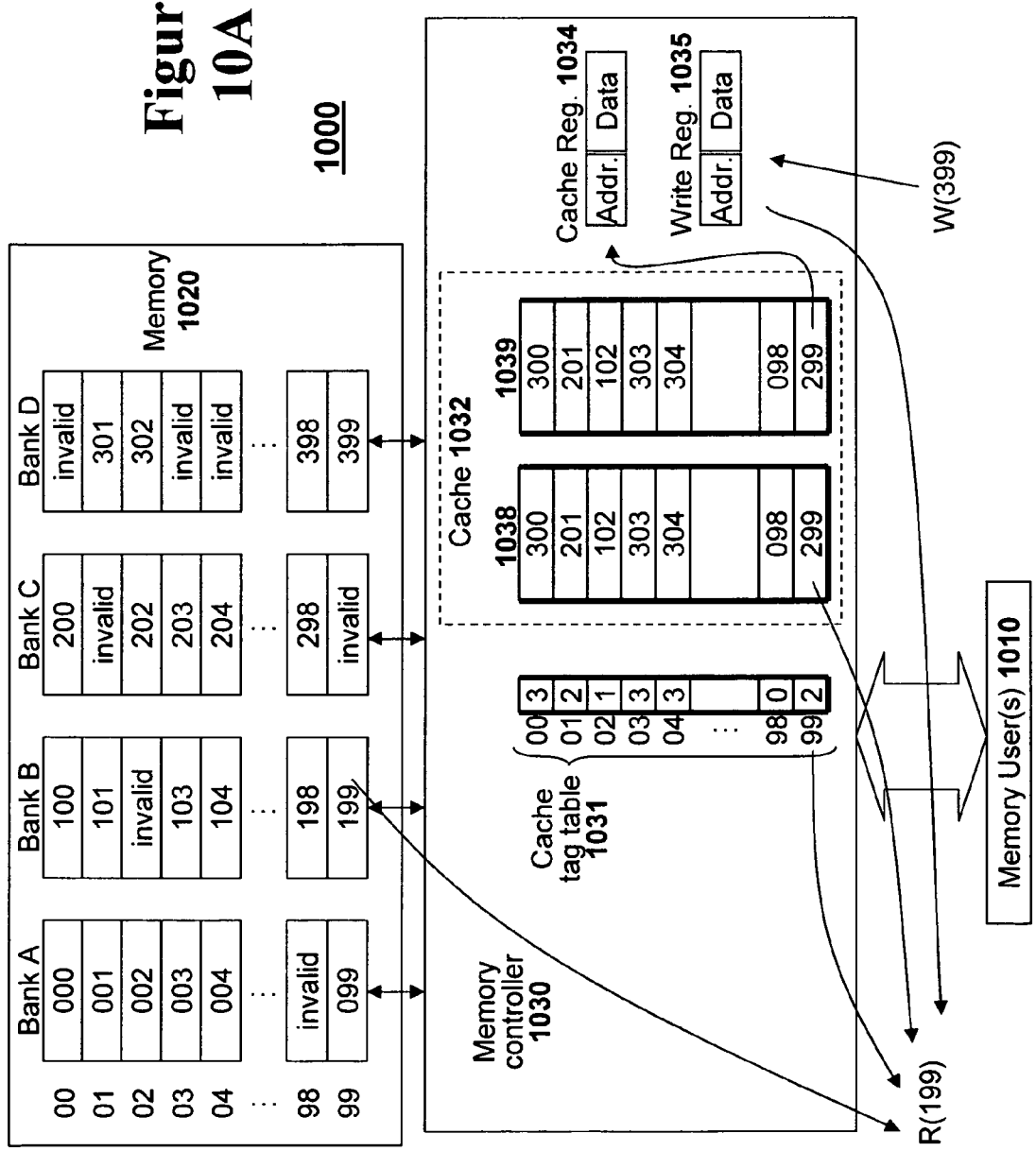
FIG. 10A illustrates a conceptual diagram describing the how the memory system depicted in FIG. 8 resolves read requests and prepares for resolving write requests in a following memory cycle.
Figure 10B:
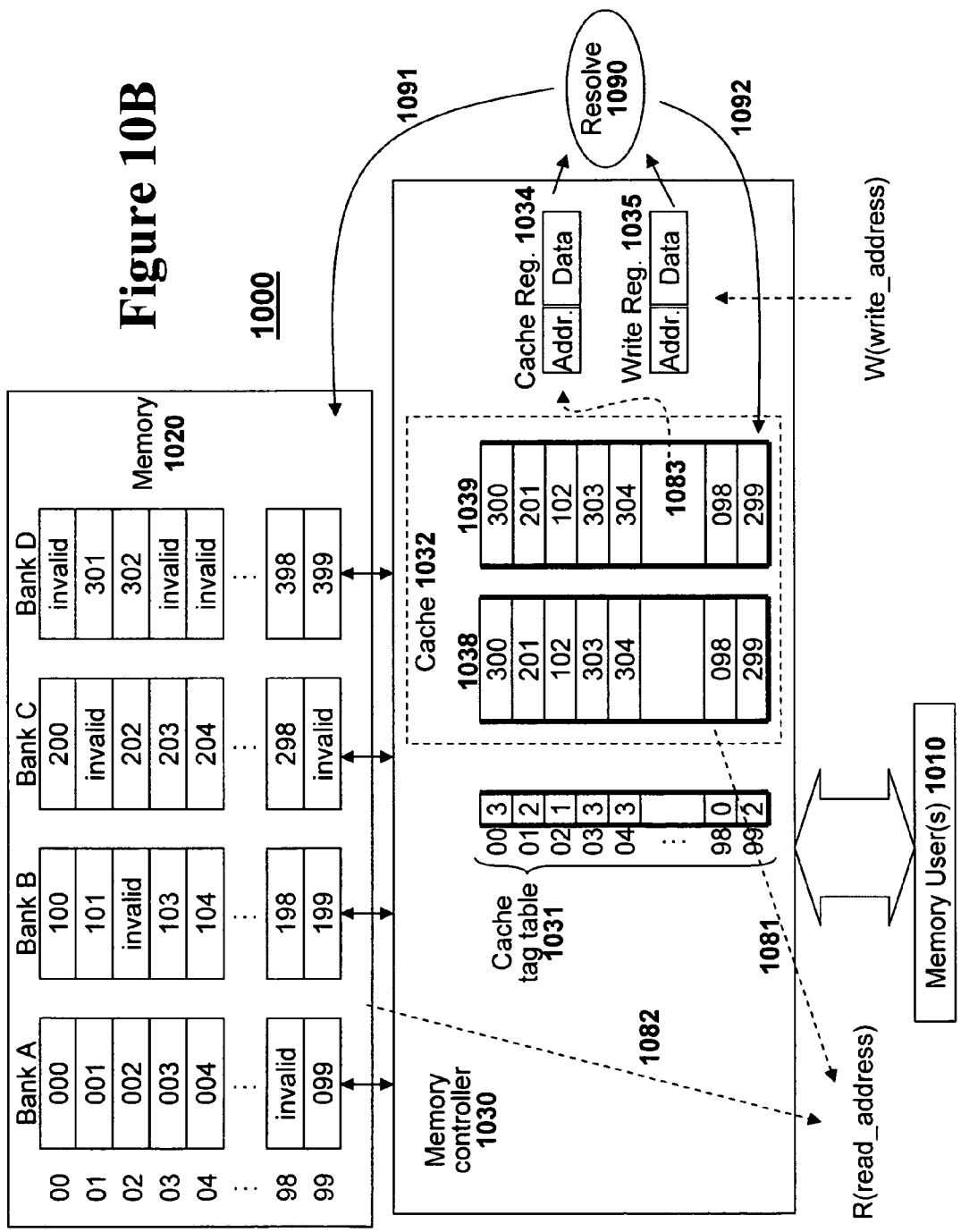
FIG. 10B illustrates a conceptual diagram describing the how the memory system depicted in FIG. 8 resolves write requests.

Referring to FIGS. 9A and 10A, one read request and one write request are received by the memory system 1000 at stage 905. In the conceptual diagram of FIG. 10A, the read request is depicted as R(199) (a read from address 199) and the write request is depicted as W(399) (a write request to address 399). Next, at stage 910, the memory controller uses the address associated with the read request (address 199) to read the associated main memory location, the associated cache tag table entry, the associated cache memory entry, and the temporary write register 1035. This is illustrated conceptually in FIG. 10A as reading from address 199 in the main memory 1020, the '99' row of the cache tag table 1031, the '99' row entry of a first copy cache memory 1038, and the temporary write register 1035. The memory controller then resolves all of this information to return the proper data in response to the read request.

The data value with highest priority is the data value from the temporary write register 1035 since that register may have a new data value that was recently received (and will be used to over-write an outdated value in either the main memory 1020 or the cache memory 1032). The memory controller 1030 tests the address of the data from the temporary write register 1035 at stage 915 and if the temporary write register 1035 contains the requested data then the memory controller 1030 responds to the read request with that data from the temporary write register 1035 at stage 920.

If the requested data (address 199) is not in the temporary write register 1035 then the memory controller 830 will respond to the read request with data from either the main memory 1020 or the cache memory 1032. At stage 925, the memory controller 830 determines if the requested data resides within the cache memory 1032. If the entry from the cache tag table 1031 indicated that the requested data was in the cache memory 1032, then the memory controller 1030 responds to the read request with the data fetched from the first cache memory copy 1038 at stage 930. On the other hand, if the entry from the cache tag table 1031 indicated that the requested data (address 199) was not in the cache memory 1032, then the memory controller 1030 responds to the read request with the data fetched from the main memory 1020 at stage 940.

Note that whether the memory controller 1030 responds to the read with data from temporary write register 1035, the cache memory 1032, or the main memory 1020 the response is immediate since the data from all of those locations was fetched simultaneously and is all ready to respond to the read request. Thus, there is no latency introduced into the memory system by first reading a look-up table to determine where the valid data currently resides and then subsequently reading the data from that location. Furthermore, although the decisions illustrated in stages 915 and 925 are illustrated in serial order, those decisions occur at the same time in a real implementation such that the memory system responds quickly (with one of the responses listed in stages 920, 930, and 940).

In one embodiment, the cache tag table 1031 and the cache memory 1032 are constructed with memory circuits that provide a response faster than the main memory 1020 will provide a response. This allows logic to determine if the data fetched from cache memory 1032 is the desired current data before the data from main memory 1020 has been received.

This same type of technique is employed in other areas of the memory system as well. For example, the specific memory circuits used to implement the main memory 1020, the cache memory 1032, and the associated cache tag table 1031 may be selected with designs that are capable of operating at higher clock frequencies that those circuits will actually be run at. For example, a memory circuit that can operate at 800 MHz may be selected even though that memory circuit will only be run with a 500 MHz clock. In this manner, the results will be received faster such that some additional logic may be applied to the returned and still remain within the timing limits.

Various techniques may be used when selecting and laying out memory circuits for an implementation that will reduce latency. For example, the main memory 1020, the cache memory 1032, and the associated cache tag table 1031 may be constructed from small physical 'cuts' of memory in order to reduce the latency of such memory circuits. In some situations, these memory circuits may be constructed from very fast memory circuits suck as register files and flip-flops to further reduce the latency.

All digital logic introduces some 'propagation delay' as the electrical signals must pass through the various transistors and diodes before reaching a destination. The more transistors and diodes that a signal must travel through, the more propagation delay is added. To minimize latency (which is often caused by propagation delay), an implementation should use fast memory circuits and efficient logic such that the latency is minimized. In one implementation, fast memory circuits and efficient logic are used such that the actual latency of the main memory circuit and the additional latency of the design logic that operates using the data from the memory will all fall within the same clock cycle. For example, in an implementation with a main memory latency of 1.5 nanoseconds and a logic latency of 0.4 nanoseconds for logic that acts upon the data from the main memory, the total latency of the system is 1.9 nanoseconds. In this case the implementation has less than two nanoseconds of latency. With a 500 MHz clock frequency, each clock cycle is two nanoseconds such that a system with a main memory latency of 1.5 nanoseconds and an additional logic latency of 0.4 nanoseconds would accomplish all the needed work within a single clock cycle. This is the same as directly using a 500 MHz memory device directly.

Referring back to FIG. 10A, whether the memory controller 1030 responds to the read request with data from the temporary write register 1035 at stage 920, the cache memory 1032 at stage 930, or the main memory 1020 at stage 940, the memory controller 1030 will handle the write request at stage 950 in the same manner. Specifically, the memory controller 1030 will store the information associated with the write request (the destination address and the data to be stored) in the temporary write register 1035 at stage 950. In addition, the memory controller 1030 will read the cache entry associated with the write address (address 399 in this example) from the second cache copy 1039 and copy it into a cache register 1034. The storing of the information associated with the write request into a temporary write register 1035 and the reading of the associated cache entry into cache register 1034 allows the memory controller 830 to resolve the write request in a later memory cycle without conflicting with the either the read operation in the current cycle or the read operation in a later memory cycle when the write request is resolved.

Although the actions are not illustrated concurrently in FIG. 9A for clarity, the reading of the cache entry associated with the write request from the cache memory 1032 in stage 950 may be occurring simultaneously with the read of the cache memory 1032 for the read operation being performed according to step 910. These two simultaneous reads from cache memory 1032 are possible since the cache memory 1032 is comprised of duplicate caches 1038 and 1039 in the embodiment of FIG. 10A although other memory designs that allow for two read operations may be used. Thus, the read for handing the read request operation may access cache copy 1038 and the read needed in preparation for handing the write operation may access cache copy 1039.

Figure 9B:
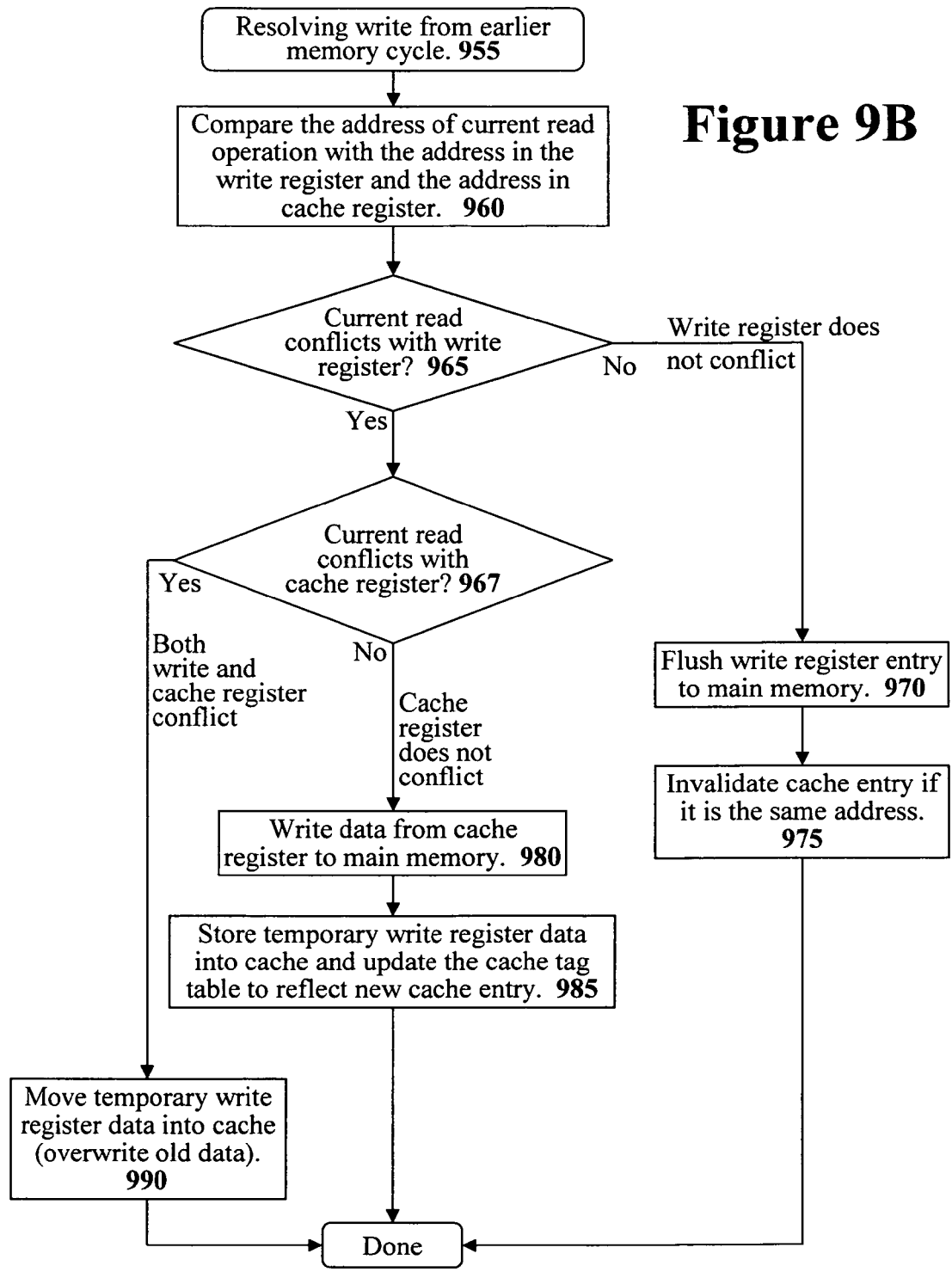
FIG. 9B illustrates a flow diagram describing the how the memory system depicted in FIG. 8 resolves write requests in a following memory cycle.

The flow diagram of FIG. 9B and the conceptual diagram of FIG. 10B illustrate how the memory controller 1030 resolves a write request that it received in an earlier memory cycle and prepared to handle. The earlier preparation consisted of storing the information associated with the write request (the target address and the data to write) into temporary write register 1035 and reading the corresponding cache entry from cache 1039 into cache register 1034 as set forth earlier with reference to step 950 in FIG. 9A.

At the top of the flow diagram in FIG. 9B, the beginning stage 955 is noted as resolving a write request from an earlier memory cycle. Note that during this handing of the write request from an earlier memory cycle is performed while simultaneously handling a new read request and a new write request received in a current memory cycle. Thus, this handling of the write request from an earlier memory cycle cannot use resources needed for handling the new read request and preparation for handing the new write request. Specifically, referring to FIG. 10B, the handling of the write request from an earlier memory cycle cannot interfere with the read 1081 from the cache 1038, the read operation 1082 from main memory 1020, and the read 1083 used to prepare for handling the write request in the next memory cycle.

At stage 960, the memory controller 1030 compares the address of the current read with the address of the write operation in the temporary write register 1035 (the write operation from an earlier cycle) and the address of the data entry in the cache register 1034 (that was read from cache memory 1039). These comparisons are done to prevent the handling of the write operation from conflicting with the current read operation 1082 from main memory 1020. At stages 965 and 967 (and conceptually illustrated as resolve operation 1090 in FIG. 10B), the results of the comparisons are used to select a method for handling the write operation from an earlier write memory cycle.

If the comparison at stage 965 indicates that the write information stored in the temporary write register 1035 does not conflict with the current read operation from the main memory then the memory controller 1030 can just store the data value from the temporary write register 1035 into the main memory at stage 970. This storage of data from the temporary write register 1035 is conceptually illustrated as write 1091 from resolve operation 1090 in FIG. 10B. In this manner, the write request from the previous memory cycle is simply handled as a non conflicting write to an independent memory bank in the main memory 1020. Note that the information that was read from the cache 1032 and placed into cache register 1034 still resides within the cache 1032 and may remain there. However, if the value in the temporary write register 1035 has the same address as the value represented in the cache register 1034 (an over-write occurred) then the memory controller 1030 must also invalidate that corresponding entry in the cache 1032 at stage 975 since that over-written data value in the cache 1032 is now outdated by the new data value that was just written to the address in main memory at stage 970.

If the current read operation conflicts with the data in the write register 1035 at stage 965 then the system proceeds to stage 967 to determine if the current read operation conflicts with the data in the cache register 1034. If the address of the value in the cache register 1034 does not conflict with the current read operation then the memory controller 1030 may store the data from that cache register 1034 into the main memory 1020 at stage 980. Again, this is illustrated as the write 1091 from the resolve operation 1090 in FIG. 10B. The memory controller 1030 also writes the data value from the temporary write register 1035 into the associated entry in the cache memory 1032 as set forth in stage 985. This is conceptually illustrated in FIG. 10B as a write 1092 from the resolve operation 1090 to the cache memory 1032. Note that in this particular implementation the write 1092 to the cache memory 1032 will update both copies (1038 and 1039) in the cache memory 1032. Simultaneously, the memory controller 1030 also updates the cache tag table 1031 to reflect the new data that has been written into the cache memory 1032 from the temporary register 1035.

Note that when neither the value in the temporary cache register 1034 nor the value in the temporary write register 1035 conflicts with the current read operation, then either of those two values could be stored into the main memory 1020. Thus, the order of stages 965 and 967 could be reversed. However, in the specific embodiment disclosed in FIG. 9B, when neither conflicts with current read operation the memory controller 1030 stores the value in the temporary write register 1035 into the main memory 1020 since that action requires less work (since the cache tag table 1031 and the cache memory 1032 will not need to be updated) and will thus consume less energy.

Referring back to stage 967, if both the value in the cache register 1034 and the value in the temporary write register 1035 conflict with the current read operation 1082, then neither of these data values can be written to the main memory 1020 due to the conflict with the read operation. However, the only time when both the value in the cache register 1035 and the value in the temporary write register 1035 can conflict with the current read operation is when those two register values refer to the very same memory address. (The value read from the cache 1032 into the cache register 1034 contains data associated with the same memory address that the write operation stored in the temporary write register 1035 is targeting.) Thus, in this situation the memory controller 1030 will just store the new write data in temporary write register 1035 into the corresponding cache memory entry as specified in stage 990. This operation over-writes the old data in the cache memory 1032 with the new data from write request of the earlier memory cycle.

As set forth in FIG. 9B, the data in both the cache register 1034 and the temporary write register 1035 will always be handled in one way or another thus emptying those two registers. This allows the cache register 1034 and the temporary write register 1035 to be available to accept the new information associated with a subsequent write request in a pipelined manner.

Referring to FIG. 10B, it can be seen that the cache memory 1032 is implemented with one read and one update (1R1U) memory system. Specifically, the cache memory 1032 must be able to handle a read 1081 from the cache 1038 to handle the read request, a read 1082 from cache 1039 to prepare for resolving the write request, and a write 1092 (to both cache 1038 and 1039) in order to handle the write request from an earlier memory cycle.

Figure 11B:
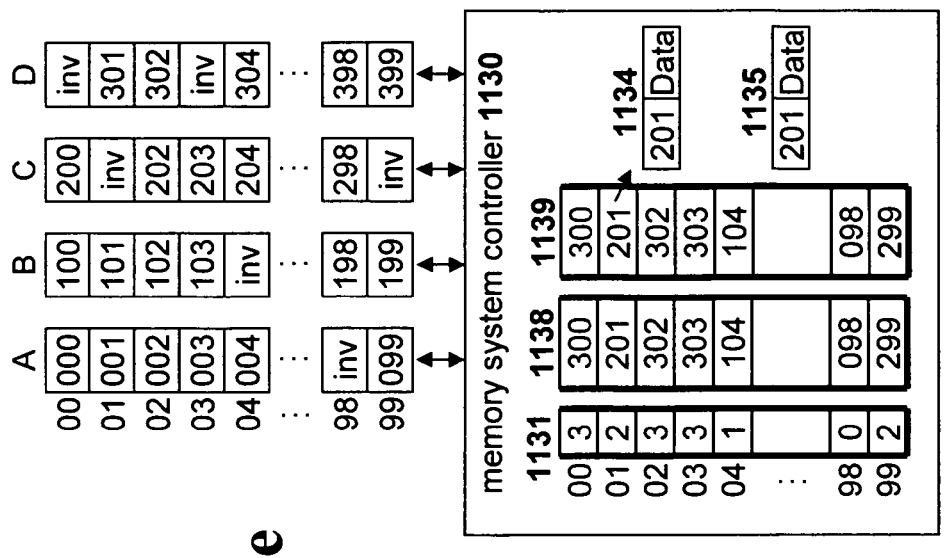
FIG. 11B illustrates the memory system of FIG. 1A after processing the read request and the write request.
Figure 11A:
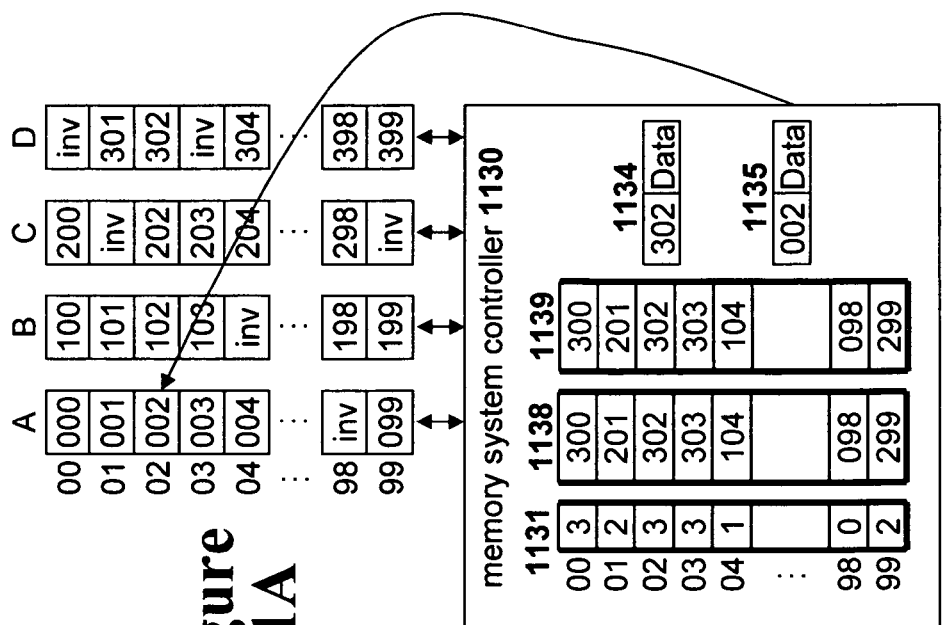
FIG. 11A illustrates a starting state for an example operation of the memory system of FIG. 8 receiving a read request and a write request.

To illustrate the operation of the reduced latency memory system of FIG. 8, several examples are hereby provided with reference to FIGS. 11A to 11F. FIG. 11A illustrates an example starting state of a reduced latency memory system that is receiving a read from address 303 and a write to address 201. The read from address 303 is handled by reading the current values in temporary write register 1135, address 303 in the main memory, the '03' row entry in the cache 1038 (that would be used to store address 303), and the cache tag table 1131. The memory system then responds with the data from the location that actually had the valid data for address 303. Note that the value in temporary write register 1135 always takes priority since it contains the data from the most recent write operation. In this case the read from address 303 is handled using the data from the '03' row of cache 1138 since that location was storing the current data value of address 303.

The write to address 201 is handled by reading the '01' row from the cache 1139 into the cache register 1134 and storing the information for that write operation (the address 201 and the data to be written into address 201) into the write register 1135. However, before storing the information from the write request into the write register 1135 the previous value must be moved out of write register 1135. In this case, the data for address 002 is written into the main memory since a write to address 002 in bank A does not conflict with the read from address 303 in bank D. FIG. 11B illustrates the final state of the reduced latency memory system of FIG. 11A after handling the read from address 303 and the preparation for resolving the write to address 201. The only changes that have occurred are the flush of the data from write register 1135 that overwrites address 002 in main memory, the read of the '01' row from the cache 1139 into the cache register 1134, and the storing of the information for the write to address 201 into temporary write register 1135.

Figure 11D:
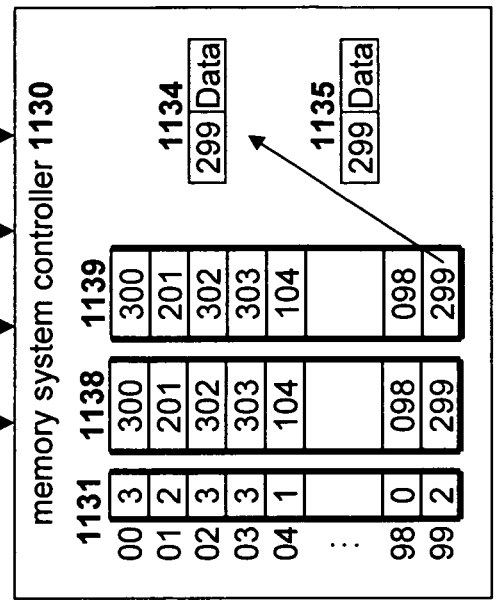
FIG. 11D illustrates the memory system of FIG. 11C after processing the read request and the write request.
Figure 11C:
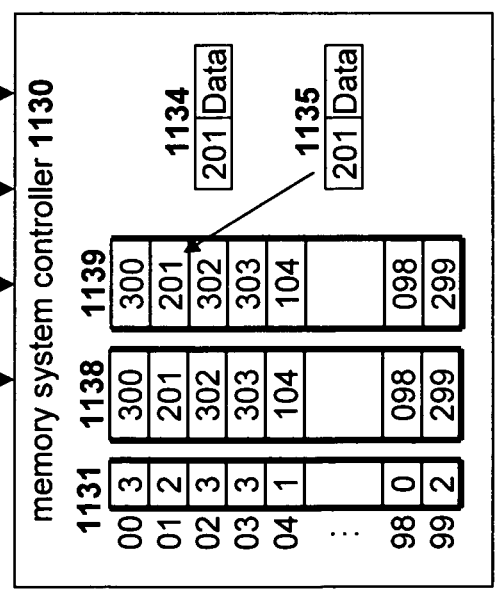
FIG. 11C illustrates the memory system of FIG. 11B receiving a new read request and write request.

FIG. 11C illustrates the state of the memory system in FIG. 11B receiving a read from address 202 and a write to address 299. As before, the read is handled by reading from the main memory, the cache 1138, and the write register 1135 and then responding with the data from the location that had the valid data for address 202. In this case, the read request from address 202 is handled using the data from address 202 in the main memory. The write is handled by storing the write request information into the write register 1135 and copying the associated entry from cache 1139 (the row 99 entry) into cache register 1134.

Simultaneously, the reduced latency memory system must handle the write to address 201 stored in temporary write register 1135 from the earlier memory cycle. Since the write data in temporary write register 1135 is for address 201 that is located in the same bank where the current read operation from address 202 is reading from, the data in temporary write register 1135 cannot be stored into the main memory. Similarly, the corresponding cache register 1134 data value also conflicts with the read operation. However, the only reason why both the data in the temporary write register 1135 and the data in the cache register 1134 can conflict with the read operation is that both the cache register 1134 and the write register 1135 refer to the same address (address 201 in this example). Thus, newer data for address 201 from temporary write register 1135 is used to over-write the older data in the 01 row entry the cache. Note that the write from write register 1135 overwrites the data in both 01 row entry copies in caches 1138 and 1139. The data for the new write to address 299 can then be placed in write register 1135 and the corresponding entry from the cache 1139 (the '99' row) copied into the cache register 1134. The final state after the read from address 202 and the write to address 299 is illustrated in FIG. 11D.

Figure 11F:
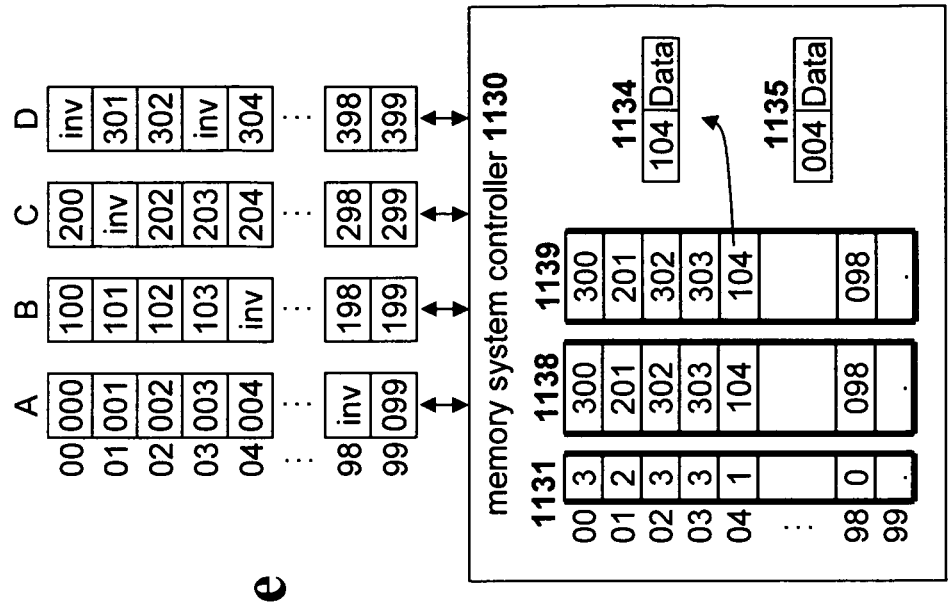
FIG. 11F illustrates the memory system of FIG. 11E after processing the read request and the write request.
Figure 11E:
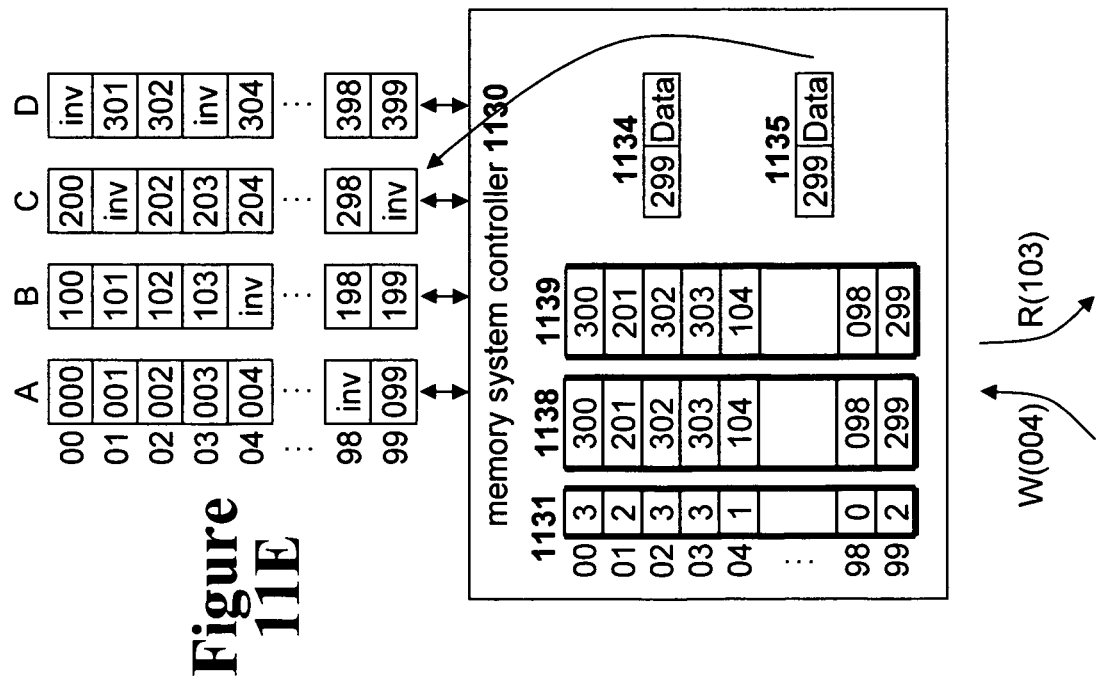
FIG. 11E illustrates the memory system of FIG. 11D receiving a new read request and write request.

FIG. 11E illustrates the state of the memory system in FIG. 11D receiving a read request for address 103 and a write request to address 004. Once again, the reduced latency memory system handles the read request by reading from the main memory, the cache memory 1138, and the temporary write register 1135 and then responding with the data from the location that had the valid data for address 103. In this case, the read request for address 103 is handled using the data from the main memory.

Simultaneously, the reduced latency memory system must handle the write to address 299 from the previous memory cycle that is stored in write register 1135. Since the write data in temporary write register 1135 is for address 299 in bank C that does not conflict with the read from address 103 in bank B, the memory controller 1130 may flush the data in write register 1135 into address 299 in the main memory. However, address 299 was previously represented in the cache memory such that the cache memory entry for address 299 must be invalidated. Thus, the memory controller marks the corresponding entry in the cache tag table 1131 as not containing information (which renders the corresponding data values in the cache copies 1138 and 1139 invalid). After the store of the data from temporary write register 1135 to address 299 in the main memory, the data for the new write to address 004 can then be placed in write register 1135 and the corresponding '04' row entry of the cache memory is read into cache register 1134. The final state after the read from address 103 and the write to address 004 is illustrated in FIG. 11F.

Memory Requirements for the Low Latency Cache Memory System

All of the memory systems described in the previous sections require memory circuits that provide various needed features. For all three systems, the main memory is a banked memory system wherein the individual memory banks can operate independently. In addition, all three systems require additional higher performance memory sections for the memory controller.

With the reduced-latency cache based memory system 800 disclosed in FIG. 8, the memory controller 830 requires a one-read and one update (1R1U) memory that is used as the cache memory 832. A one-read and one update (1R1U) memory actually needs to perform two read operations and a single write operation. The first read is a normal read, the second read is the read of a memory location that will be updated with a write in a later memory cycle (the update), and the write is a write of data read in a previous memory cycle (the update). In the reduced latency memory system 800, the first read is used to read out a cache entry that may be used to handle the current read operation, the second read is used to read out a cache memory entry associated with a current write operation for a potential flush back to main memory 820, and the write operation is used to handle a potential write-back (update) of a cache entry that was read in association with a write operation from an earlier memory cycle.

It is not trivial to implement a one-read and one update (1R1U) memory. In the reduced latency memory system implementations set forth in FIGS. 8 to 11F, the one-read and one update (1R1U) memory was constructed using a duplicated 1 update (1U) memory system (two identical 1 update memories such that two different read operations may be performed). However, other memory designs may be used to implement the one-read and one update (1R1U) memory needed for the cache memory 832.

Low-Latency 1 Read and 1 Update Memory

The reduced latency memory system set forth in FIGS. 8 to 11F discloses a one read and one write (1R1W) memory system wherein the read operation and the write operation are completely independent from each other. Some memory applications, such as maintaining statistics counters, will always have a read followed by a write to the same address. Such a memory system is referred to as an "update memory" since a data value is read, modified (updated), and then written back. In an optimized update memory system, the memory will handle a new read operation at the same time as a write operation from an earlier read. The techniques of the present disclosure can be used to construct a low latency one update memory system.

Figure 12:
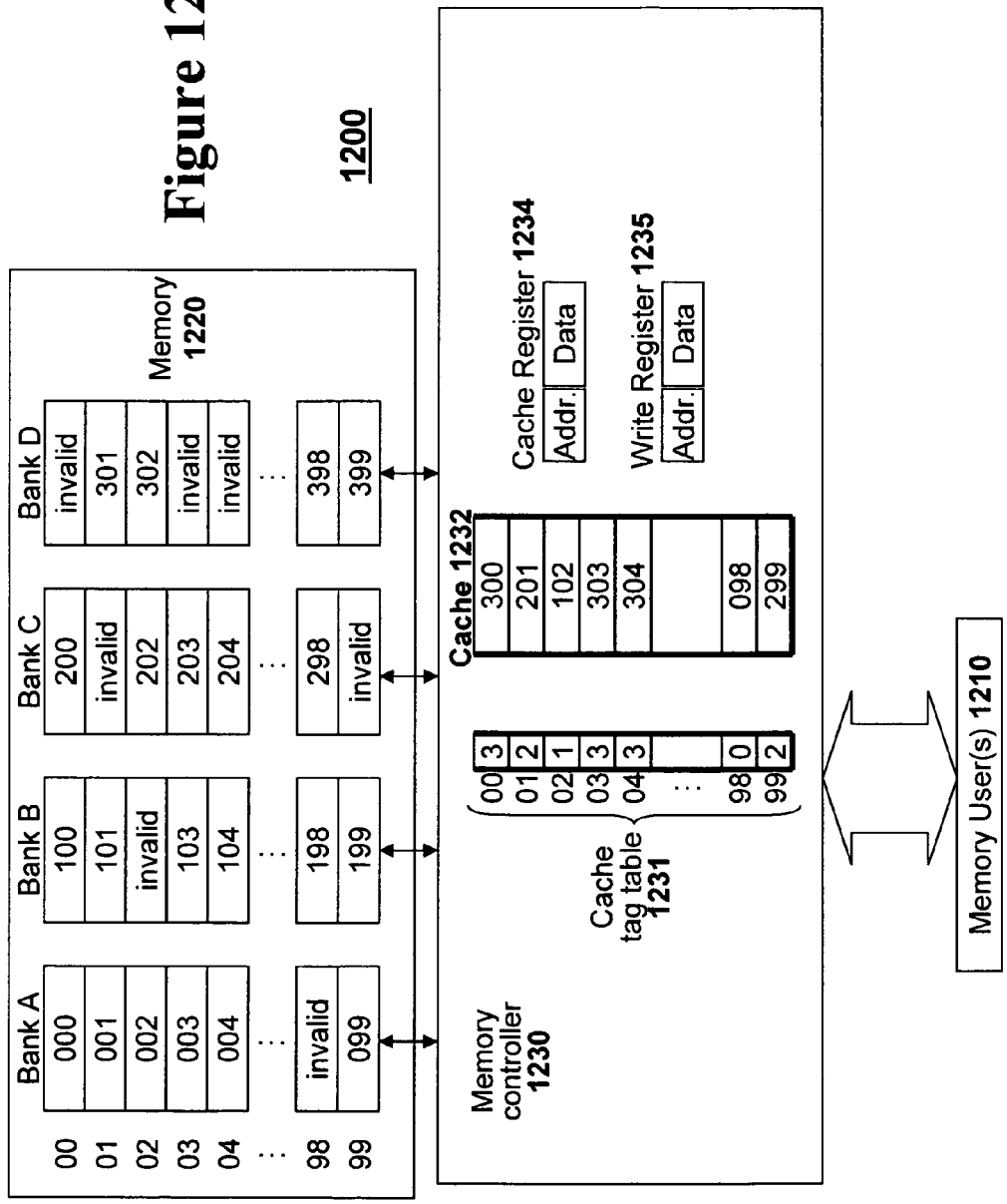
FIG. 12 illustrates a block diagram of a cache-based memory system for handling simultaneously handing a read operation and write operation associated with an earlier read operation to create a reduced latency one update (1U) memory requests.

With a one update (1U) memory system, the write operation will always be writing back to a memory location accessed in an earlier read operation. Thus, within the memory controller of the memory system, data associated with that earlier read operation may be carried in a pipeline to help handle the subsequent write operation. One specific item of data that may be carried forward is the data read out of the cache memory system in the memory controller such that the data read out of the cache memory system is available when the subsequent write operation occurs. This fact allows a one update (1U) memory system to use a less expensive type of memory to implement the cache memory system. Specifically, FIG. 12 illustrates a one update (1U) memory system 1200. In the one update (1U) memory system 1200 when a read operation is received, the data read out of the cache 1232 (for responding to the read operation) is then carried along in a pipeline terminating in cache register 1234 at the time when the later write operation is received. Thus, the cache memory does not have to be read when the subsequent write operation is received. This eliminates a read of the cache 1232 needed to help resolve the write operation such that the cache memory 1232 may be implemented with one update (1U) memory (instead of a 1R1U as set forth in the previous section) since only the one read is required to handle the read operation. The subsequent write operation is handled with data carried forward in the pipeline.

Handling More than One Write

The reduced latency system presented above can be adapted to handle more than one write per memory cycle. One method of handing more than one write is to implement multiple caches and institute proper cache management techniques. In this manner, the reduced latency memory system will allow multiple writes to be supported.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of handling memory access requests in a digital memory system, said method comprising:

receiving a memory read request for a first address and a memory write request with a write data value to a second memory address;

simultaneously fetching a first read data item from said first address in a main memory, a second read data item from a first cache entry in a cache memory associated with said first address, a cache tag value associated with said first cache entry, and a third read data item from a write register containing information from a memory write data made in an earlier memory cycle;

comparing said first address with said cache tag value to determine if said first address was represented in said cache memory;

returning said third data item in response to said read request if said first address was currently represented in said write register said first data item in response to said read request if said first address was currently represented in said main memory or returning said second data item in response to said read request if said first address was currently represented in said cache memory; and resolving said memory write request to said second address in a later memory cycle by retrieving a cache data value from a second cache entry in said cache memory associated with said second address, flushing said write data value to said main memory if a write to second memory address does not conflict with a new read of said main memory occurring in said subsequent memory cycle, and flushing said cache data value to said main memory if a memory address associated with said cache data value does not conflict with said new read of said main memory occurring in said subsequent memory cycle.

2. The method of handling memory access requests in a digital memory system as set forth in claim 1, said method further comprising, in a subsequent memory cycle:

writing said write data value into said cache data entry in said cache memory if a write to said second memory address and a write to said memory address associated with said cache data value both conflict with said new read of said main memory occurring in said subsequent memory cycle.

3. The method of handling memory access requests in a digital memory system as set forth in claim 1 wherein said cache memory comprises a one read and one update memory circuits.

4. The method of handling memory access requests in a digital memory system as set forth in claim 1, said method further comprising:

storing said a write data value and said second memory address of said write request into in a write register.

5. The method of handling memory access requests in a digital memory system as set forth in claim 4, said method further comprising:

retrieving a second cache data value from a second cache entry in said cache memory and storing said second cache data value into a cache register, said second cache entry associated with said second address.

6. The method of handling memory access requests in a digital memory system as set forth in claim 5, said method further comprising:

resolving said write request in a later memory cycle using said write data value in said write register and said second cache data value in said cache register.

7. The method of handling memory access requests in a digital memory system as set forth in claim 1 wherein said main memory comprises embedded DRAM and said cache memory comprises embedded DRAM, SRAM, register file, or flip-flops.

8. The method of handling memory access requests in a digital memory system as set forth in claim 1 wherein said main memory comprises SRAM and said cache memory comprises embedded DRAM, SRAM, register file, or flip-flops.

9. The method of handling memory access requests in a digital memory system as set forth in claim 1 wherein said main memory comprises a register file and said cache memory comprises embedded DRAM, SRAM, register file, or flip-flops.

10. The method of handling memory access requests in a digital memory system as set forth in claim 1 wherein said main memory comprises a any single port embedded memory and said cache memory comprises embedded DRAM, SRAM, register file, or flip-flops.

11. A digital memory system for simultaneously handing a write request addressing a first address and a read request addressing a second address, said method digital memory system comprising:
a main memory comprising several independent memory banks;
a cache memory, said cache memory equal in size to one of said several independent memory banks;
a cache tag memory associated with said cache memory;
a cache register for storing a first cache value read from a first entry said cache memory associated with said first address;
a write register for storing a write data value and said first address associated with said write request; and
a memory controller for handing said read request and said write request;
wherein said memory controller simultaneously reads said second address in said main memory bank, a second entry in said cache memory associated with said second address, and a cache tag entry associated with said second entry from said cache tag memory upon receiving said read request and returns data from said second address in said main memory if said main memory has a current value for said second address or data from said second entry in said cache memory associated with said second address if said second entry in said cache memory associated with said second address has the current data value for said second address, and said memory controller flushes said write data value in said write register to said main memory if a write to second memory address does not conflict with a new read of said main memory or flushes said cache data value to said main memory if a memory address associated with said cache data value does not conflict with said new read of said main memory.

12. The digital memory system as set forth in claim 11 wherein said memory further reads said write register and returns data from said write register if said write register has the current data value for said second address.

13. The digital memory system as set forth in claim 11 wherein said memory controller writes said write data value in said write register into said cache data entry in said cache memory if a write to said second memory address and a write to said memory address associated with said cache data value both conflict with said new read of said main memory.

14. The digital memory system as set forth in claim 11 wherein said cache memory comprises a one read and one update memory.

15. The digital memory system as set forth in claim 11 wherein said memory controller resolves said write request in a memory cycle subsequent to responding to said read request.

16. The digital memory system as set forth in claim 11 wherein said main memory comprises embedded DRAM and said cache memory comprises embedded DRAM, SRAM, register file, or flip-flops.

17. The digital memory system as set forth in claim 11 wherein said main memory comprises SRAM and said cache memory comprises embedded DRAM, SRAM, register file, or flip-flops.

18. The digital memory system as set forth in claim 11 wherein said main memory comprises a register file and said cache memory comprises embedded DRAM, SRAM, register file, or flip-flops.

* * * * *